(12) United States Patent
Sasaki et al.

(10) Patent No.: US 11,548,824 B2
(45) Date of Patent: *Jan. 10, 2023

(54) SOLID ELECTROLYTE AND ALL-SOLID SECONDARY BATTERY

(71) Applicant: TDK CORPORATION, Tokyo (JP)

(72) Inventors: Takashi Sasaki, Tokyo (JP); Tetsuya Ueno, Tokyo (JP); Gakuho Isomichi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 130 days.

This patent is subject to a terminal disclaimer.

(21) Appl. No.: 16/491,036

(22) PCT Filed: Mar. 29, 2018

(86) PCT No.: PCT/JP2018/013452
§ 371 (c)(1),
(2) Date: Sep. 4, 2019

(87) PCT Pub. No.: WO2018/181812
PCT Pub. Date: Oct. 4, 2018

(65) Prior Publication Data
US 2020/0010369 A1    Jan. 9, 2020

(30) Foreign Application Priority Data

Mar. 30, 2017  (JP) .............................. JP2017-068913

(51) Int. Cl.
*H01M 10/00*  (2006.01)
*C04B 35/488*  (2006.01)
(Continued)

(52) U.S. Cl.
CPC ............. *C04B 35/488* (2013.01); *H01B 1/08* (2013.01); *H01M 10/0562* (2013.01)

(58) Field of Classification Search
CPC ......... H01M 10/0562; H01M 10/0525; H01M 2300/0077; H01M 10/052;
(Continued)

(56) References Cited

U.S. PATENT DOCUMENTS

2010/0028782 A1    2/2010 Inda
2011/0244337 A1   10/2011 Ohta et al.
(Continued)

FOREIGN PATENT DOCUMENTS

CN    104600356 A    5/2015
EP     3428929 A1    1/2019
(Continued)

OTHER PUBLICATIONS

Machine translation of JPH02250264A, translated Sep. 3, 2019 (Year: 1990).*

(Continued)

*Primary Examiner* — Nicholas P D'Aniello
(74) *Attorney, Agent, or Firm* — Oliff PLC

(57) ABSTRACT

A solid electrolyte, in which a part of an element contained in a mobile ion-containing material is substituted, and an occupied impurity level that is occupied by electrons or an unoccupied impurity level that is not occupied by electrons is provided between a valence electron band and a conduction band of the mobile ion-containing material, and a smaller energy difference out of an energy difference between a highest level of energy in the occupied impurity level and an energy and a LUMO level difference between a lowest level of energy in the unoccupied impurity level and a HOMO level is greater than 0.3 eV.

6 Claims, 19 Drawing Sheets

(51) Int. Cl.
   *H01B 1/08* (2006.01)
   *H01M 10/0562* (2010.01)
(58) Field of Classification Search
   CPC .......... H01M 2300/0068; Y02E 60/10; C01B
         25/45; H01B 1/06; H01B 1/08; C04B
         35/488; C04B 35/486; C04B 2235/3201;
         C04B 35/462; C04B 2235/3203; C04B
         2235/3206; C04B 2235/3227; C04B
         2235/3239; C04B 2235/3241; C04B
         35/547; C04B 2235/3244; C04B
         2235/3251; C04B 2235/3258; C04B
         2235/3262; C04B 2235/3272; C04B
         2235/3279; C04B 2235/3287; C04B
         2235/3293; C04B 2235/3294; C04B
      2235/446; C04B 2235/764; C04B 35/447
   See application file for complete search history.

(56) References Cited

U.S. PATENT DOCUMENTS

| | | | |
|---|---|---|---|
| 2012/0231350 | A1 | 9/2012 | Nishida et al. |
| 2012/0308900 | A1 | 12/2012 | Ogasa |
| 2012/0328959 | A1* | 12/2012 | Hayashi ............ H01M 10/0525 |
| | | | 429/319 |
| 2013/0273437 | A1 | 10/2013 | Yoshioka et al. |
| 2014/0134504 | A1* | 5/2014 | Brown ................ H01M 8/1004 |
| | | | 429/403 |
| 2014/0197351 | A1* | 7/2014 | Balagopal .......... C04B 35/6261 |
| | | | 252/62.2 |
| 2015/0064576 | A1 | 3/2015 | Aitken et al. |
| 2015/0118573 | A1 | 4/2015 | Yokoyama et al. |
| 2015/0333366 | A1 | 11/2015 | Sato et al. |
| 2016/0141716 | A1* | 5/2016 | Ito ......................... H01M 4/136 |
| | | | 429/162 |
| 2016/0164135 | A1* | 6/2016 | Fasching ............... H01M 4/136 |
| | | | 429/319 |
| 2019/0067736 | A1 | 2/2019 | Yoshioka et al. |
| 2021/0036362 | A1 | 2/2021 | Ueno et al. |

FOREIGN PATENT DOCUMENTS

| | | | |
|---|---|---|---|
| JP | H02-250264 | A | 10/1990 |
| JP | H02250264 | A * | 10/1990 |
| JP | H03-081908 | A | 4/1991 |
| JP | H04-160011 | A | 6/1992 |
| JP | H05-299101 | A | 11/1993 |
| JP | 2001-143754 | A | 5/2001 |
| JP | 2010-202499 | A | 9/2010 |
| JP | 2010-272344 | A | 12/2010 |
| JP | 2011-070939 | A | 4/2011 |
| JP | 2012-246196 | A | 12/2012 |
| JP | 2013-149493 | A | 8/2013 |
| JP | 2014-229579 | A | 12/2014 |
| JP | 2015-049981 | A | 3/2015 |
| JP | 2015-065022 | A | 4/2015 |
| JP | 2015-076324 | A | 4/2015 |
| JP | 2015-216220 | A | 12/2015 |
| JP | 2015-216221 | A | 12/2015 |
| JP | 2016-001595 | A | 1/2016 |
| JP | 2016-051539 | A | 4/2016 |
| WO | 2012/008422 | A1 | 1/2012 |
| WO | 2017/154922 | A1 | 9/2017 |

OTHER PUBLICATIONS

Jun. 12, 2018 Search Report issued in International Patent Application No. PCT/JP2018/013452.
Jun. 3, 2020 Office Action issued in Chinese Patent Application No. 201880021434.6.
Jul. 3, 2018 International Search Report issued in International Patent Application No. PCT/JP2018/013486.
Mar. 19, 2021 U.S. Office Action issued U.S. Appl. No. 16/497,624.
Jul. 23, 2021 Office Action Issued in U.S. Appl. No. 16/497,624.
Jul. 3, 2018 Search Report issued in International Patent Application No. PCT/JP2018/013477.
Apr. 2, 2021 Office Action issued in U.S. Appl. No. 16/490,861.
Aug. 3, 2021 Office Action Issued in U.S. Appl. No. 16/490,861.
Jun. 5, 2018 International Search Report issued in International Patent Application No. PCT/JP2018/013139.
Apr. 2, 2021 Office Action issued in U.S. Appl. No. 16/490,940.
Jun. 23, 2021 U.S. Office Action issued U.S. Appl. No. 16/490,940.
U.S. Appl. No. 16/490,861, filed Sep. 3, 2019 in the name of Sasaki et al.
U.S. Appl. No. 16/490,940, filed Sep. 4, 2019 in the name of Isomichi et al.
U.S. Appl. No. 16/497,624, filed Sep. 25, 2019 in the name of Sasaki et al.
Nov. 30, 2021, Non-Final Office Action Issued in U.S. Appl. No. 16/497,624.
Dec. 10, 2021 Office Action issued in U.S. Appl. No. 16/490,940.
Translation of Sep. 21, 2021 Office Action issued in Japanese Application No. 2019-510194.
Translation of Sep. 21, 2021 Office Action issued in Japanese Application No. 2019-510197.
Dec. 13, 2021 Office Action issued in U.S. Appl. No. 16/490,861.
Translation of Feb. 18, 2022 Office Action issued in Chinese Application No. 201880021650.0.
Jun. 3, 2022 Office Action Issued in U.S. Appl. No. 16/490,861.
Translation of May 10, 2022 Office Action issued in Japanese Application No. 2019-510185.
Apr. 5, 2022 Office Action Issued in U.S. Appl. No. 16/497,624.
Translation of Mar. 18, 2022 Office Action issued in Chinese Application No. 201880021444.X.
Translation of Mar. 22, 2022 Office Action issued in German Application No. 112018001797.4.
Translation of Mar. 22, 2022 Office Action issued in German Application No. 112018001798.2.
Translation of Mar. 23, 2022 Office Action issued in German Application No. 112018001738.9.
Oct. 19, 2022 Advisory Action issued in U.S. Appl. No. 16/490,861.
Adam Jolley et al, "Improving rhe ionic conducttivity of NASICON through aliovalent cation substitution of Na3Zr2SiPO12", Ionics 21, 3031-3038 (Jul. 2015).
T. Asai et al, "Moxed Conductivity of Na1+4xMx11Fe2xIIIZr2—3XP3O12,M[]:Fe2+, Co2+", Solid State Ionics 35, 319-322 (1989).
Katsuhiro Nomura, "Research on Zirconium Phosphate-based Solid Electrolytes", Mar. 23, 2993.
Homepage of KOBELCO Research Institute, "Test Preparation/avaluation of oxide-based all-solid-state battery (PDF technical material)", https://kobelcokaken.co.jp/business/sb_prototype/oxide-based.pdf.
Translation of Nov. 1, 2022 Office Action issued in Chinese Application No. 201880021650.0.

* cited by examiner

SOLID ELECTROLYTE AND ALL-SOLID SECONDARY BATTERY

TECHNICAL FIELD

The present invention relates to a solid electrolyte and an all-solid secondary battery.

The application is based upon and claims the benefit of priority from Japanese Patent Application No. 2017-068913, filed Mar. 30, 2017, the entire contents of which are incorporated herein by reference.

BACKGROUND ART

Using a non-retardant polymer electrolyte and an ionic liquid as electrolytes for batteries has been considered. However, both electrolytes contain organic substances, and it is thus impossible to eliminate concern regarding liquid leakage and ignition from batteries using these materials.

Meanwhile, all-solid secondary batteries using ceramics as electrolytes are essentially non-combustible and are highly safe, and it is thus possible to eliminate the concern regarding liquid leakage, liquid depletion, and the like. Therefore, all-solid secondary batteries have attracted attention in recent years.

As solid electrolytes for all-solid secondary batteries, various materials have been reported. For example, Patent Document 1 discloses that $LiZr_2(PO_4)_3$ can be used as a solid electrolyte. Meanwhile, $LiZr_2(PO_4)_3$ has a problem that a crystal structure changes to a structure with low ionic conductivity at a temperature of equal to or less than 60° C. and ionic conductivity is lowered.

Also, Patent Document 2 and 3 disclose that a part of zirconium in $LiZr_2(PO_4)_3$ is substituted with typical elements such as Ca. A stable phase of a crystal changes, and a rhombohedral crystal with high ionic conductivity is maintained at a room temperature.

CITATION LIST

Patent Literature

[Patent Document 1]
Japanese Unexamined Patent Application, First Publication No. 2016-51539
[Patent Document 2]
Japanese Unexamined Patent Application, First Publication No. 2015-65022
[Patent Document 3]
Japanese Unexamined Patent Application, First Publication No. 2015-76324

SUMMARY OF INVENTION

Technical Problem

However, in a case in which substitution with an element with an invariable valence is performed, it becomes impossible to keep electronic insulation when the amount of Li in a solid electrolyte varies. As a result, self-discharge occurs, and the discharge capacity of an all-solid secondary battery decreases.

The invention was made in view of the aforementioned problem, and an object thereof is to provide a solid electrolyte with electronic insulation maintained.

Solution to Problem

The present inventors conducted intensive studies in order to solve the aforementioned problem.

As a result, the inventors discovered that it was possible to prevent electrons in energy levels derived from zirconium or oxygen from being used for charge compensation at the time of charging and discharging and to maintain electronic insulation by substituting a part of a zirconium phosphate-based solid electrolyte with an element with a variable valence. That is, the following means is provided in order to solve the aforementioned problem.

(1) According to a first aspect, there is provided a solid electrolyte, in which a part of an element contained in a mobile ion-containing material is substituted, and an occupied impurity level that is occupied by electrons or an unoccupied impurity level that is not occupied by electrons is provided between a valence band and a conduction band of the mobile ion-containing material, and a smaller energy difference out of an energy difference between a highest level of energy in the occupied impurity level and a LUMO level and an energy difference between a lowest level of energy in the unoccupied impurity level and a HOMO level is greater than 0.3 eV.

(2) In the solid electrolyte according to the aforementioned aspect, a smaller energy difference out of the energy difference between the highest level of energy in the occupied impurity level and the LUMO level and the energy difference between the lowest level of energy in the unoccupied impurity level and the HOMO level may be equal to or greater than 0.7 eV.

(3) In the solid electrolyte according to the aforementioned aspect, the mobile ion-containing material may be a zirconium phosphate-based solid electrolyte, and a part of zirconium in the solid electrolyte may be substituted with at least one selected from the group consisting of Mn, Ni, Te, and W, or a part of a phosphorous in the solid electrolyte may be substituted with at least one selected from the group consisting of Cr, Mn, Fe, W, Se, Sb, and Te.

(4) In the solid electrolyte according to the aforementioned aspect, the solid electrolyte may be represented as a formula $Li_xM1_yZr_{2-y}M2_zP_{3-z}O_{12}$, M1 may be at least one selected from the group consisting of Mn, Ni, Te, and W, M2 may be at least one selected from the group consisting of Cr, Mn, Fe, W, Se, Sb, and Te, and when it is assumed that the amounts of Mn, Ni, Te, and W in M1 are $y_{Mn}$, $y_{Ni}$, $y_{Te}$, and $y_W$, respectively, in this order and that the amounts of Cr, Mn, Fe, W, Se, Sb, and Te in M2 are $z_{Cr}$, $z_{Mn}$, $z_{Fe}$, $z_W$, $z_{Se}$, $z_{Sb}$, and $z_{Te}$, respectively in this order, $1+2y_{Ni}-2y_W-2y_{Te}-z_{Cr}+2z_{Mn}-2z_{Fe}-z_W-z_{Se}-z_{Te} \leq X \leq 1+2y_{Mn}+3y_{Ni}+y_W+2y_{Te}+z_{Cr}+3z_{Mn}+3z_{Fe}+5z_W+2z_{Se}+z_{Sb}+z_{Ts}$, and $0 \leq y < 1$, and $0 \leq z < 1.5$ may be satisfied (except for y=z=0).

(5) According to a second aspect, there is provided an all-solid secondary battery including the solid electrolyte according to the aforementioned aspect.

(6) In the all-solid secondary battery according to the aforementioned aspect, a relative density of a pair of electrode layers and a solid electrolyte layer that has the solid electrolyte provided between the pair of electrode layers may be equal to or greater than 80%.

Advantageous Effects of Invention

According to the solid electrolyte of the aforementioned aspects, electronic insulation is maintained.

DESCRIPTION OF EMBODIMENTS

Figure 1:
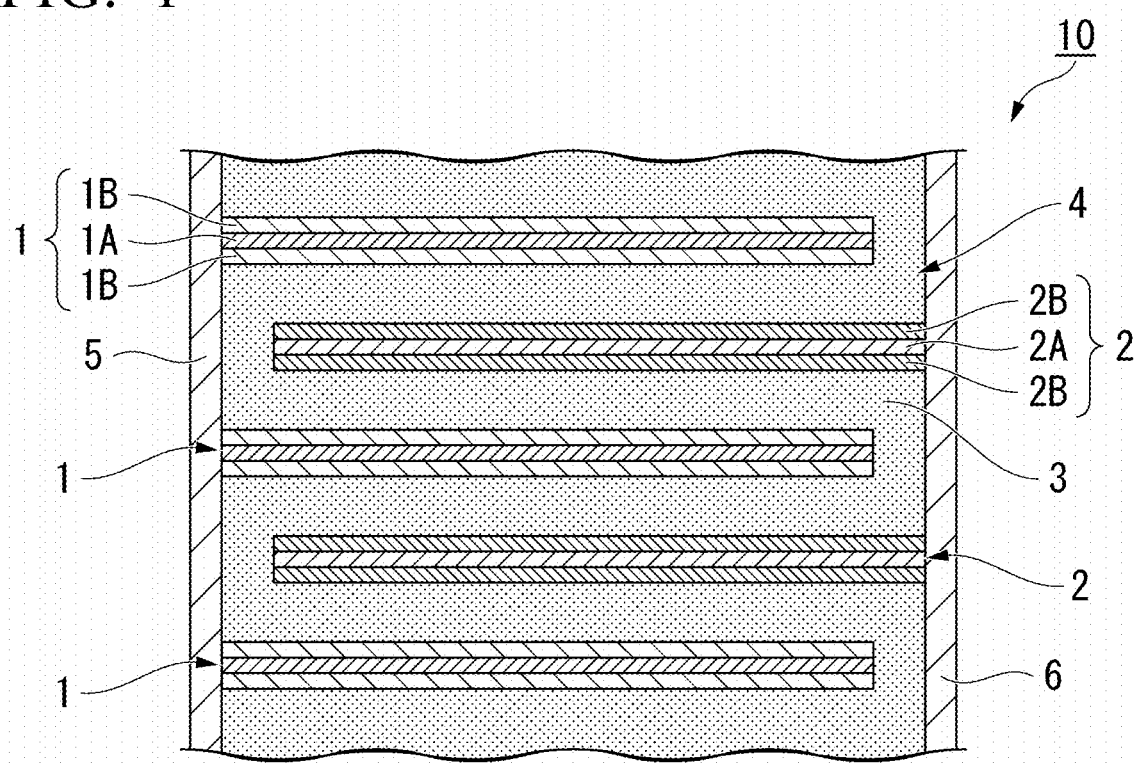
FIG. 1 is a schematic sectional view of an all-solid secondary battery according to a first embodiment.

Hereinafter, embodiments of the invention will be described in detail appropriately referring to drawings. The drawings used in the following description may show characteristic portions in an enlarged manner for convenience for easy understanding of features of the invention. Therefore, the dimensional ratios and the like of the respective components shown in the drawings may be different from actual dimensional ratios and the like. The materials, dimensions, and the like in the following description are just exemplary examples, and the invention is not limited thereto and can be appropriately modified and performed without changing the gist thereof.

[All-Solid Secondary Battery]

An all-solid secondary battery has at least one first electrode layer 1, at least one second electrode layer 2, and a solid electrolyte (mobile ion-containing material) 3 that is interposed between the first electrode layer 1 and the second electrode layer 2. The first electrode layer 1, the solid electrolyte 3, and the second electrode layer 2 are laminated in order and form a layered body 4. Each first electrode layer 1 is connected to a terminal electrode 5 disposed on one end side, and each second electrode layer 2 is connected to a terminal electrode 6 disposed on the other end side.

Any one of the first electrode layer 1 and the second electrode layer 2 functions as a positive electrode layer, and the other functions as a negative electrode layer. Hereinafter, the first electrode layer 1 is assumed to be a positive electrode layer 1, and the second electrode layer 2 is assumed to be a negative electrode layer 2 for easy understanding of the positive and negative poles of the electrode layers.

As shown in FIG. 1, the positive electrode layer 1 and the negative electrode layer 2 are alternately laminated via the solid electrolyte 3. The all-solid secondary battery 10 is charged and discharged by exchanging lithium ions between the positive electrode layer 1 and the negative electrode layer 2 via the solid electrolyte 3.

"Solid Electrolyte"

The solid electrolyte 3 is in charge of ion conduction between the positive electrode layer 1 and the negative electrode layer 2. The solid electrolyte 3 is an electronic insulator and is not in charge of electron conduction in principle. Electrons gained or lost caused by ion conduction are supplied from the outside via the terminal electrode 5. If electronic insulation of the solid electrolyte 3 is low, the charged electrons are conducted through the solid electrolyte 3. If the electrons cause self-discharge in the solid electrolyte 3, there are fewer electrons output to the outside during discharge, and a discharge capacity of the all-solid secondary battery 10 is lowered.

A part of an element forming the solid electrolyte 3 according to the embodiment is substituted, an occupied impurity level that is occupied by electrons or an unoccupied impurity level that is not occupied by electrons is provided between a valence band and a conduction band, and a smaller energy difference out of an energy difference between a highest level of energy in the occupied impurity level and a LUMO level and an energy difference between a lowest level of energy in the unoccupied impurity level and a HOMO level is greater than 0.3 eV. With such a configuration, it is possible to maintain electronic insulation regardless of variations in the amount of Li in the solid electrolyte 3 at the time of charging and discharging. This means that the solid electrolyte 3 has some capacity, and it is thus possible to increase the capacity of the all-solid secondary battery.

A part of an element forming the solid electrolyte 3 according to the embodiment may be substituted, an occupied impurity level that is occupied by electrons or an unoccupied impurity level that is not occupied by electrons may be provided between a valence band and a conduction band, and a smaller energy difference out of an energy difference between a highest level of energy in the occupied impurity level and the LUMO level and an energy difference between a lowest level of energy in the unoccupied impurity level and the HOMO level may be greater than 0.7 eV. With such a configuration, electronic insulation is more easily maintained when the amount of Li in the solid electrolyte 3 varies at the time of charging and discharging.

Any solid electrolyte 3 may be used as long as the aforementioned requirements are satisfied. For example, any of a zirconium phosphate-based solid electrolyte, a perovskite-type solid electrolyte, a NASICON-type solid electrolyte, a garnet-type solid electrolyte, and a sulfide-based solid electrolyte may be used. Also, any type of mobile ions may be employed, and any of alkali metals, alkaline earth metals, other polyvalent ions may be employed.

Examples of the solid electrolyte that satisfy the predetermined requirements from among these solid electrolytes include a zirconium phosphate-based solid electrolyte. The zirconium phosphate-based solid electrolyte means a solid electrolyte in which phosphorous, zirconium, and oxygen form main portions of a basic skeleton. Representative examples thereof include $LiZr_2(PO_4)_3$ and also include partially substituted $LiZr_2(PO_4)_3$.

In the solid electrolyte 3, a part of phosphorus or zirconium contained in the solid electrolyte is substituted with another element.

In the solid electrolyte 3 according to the embodiment, the element with which a part of phosphorus or zirconium is substituted is an element with a variable valence. If a part of phosphorous or zirconium is substituted with an element with a variable valence, it is possible to prevent electrons in energy levels derived from zirconium and oxygen forming the basic skeleton from being used for charge compensation at the time of charging and discharging and thereby to maintain electronic insulation. The following description will be given on the basis of specific examples.

FIGS. 2A to 2D are diagrams showing characteristics of a solid electrolyte in which a part of zirconium contained in the solid electrolyte is substituted with calcium that is an element with an invariable valence. Specifically, FIGS. 2A to 2D show characteristics of the solid electrolyte represented as a formula $Li_{1+0.5x}Ca_{0.5}Zr_{1.5}(PO_4)_3$.

Figure 2A:
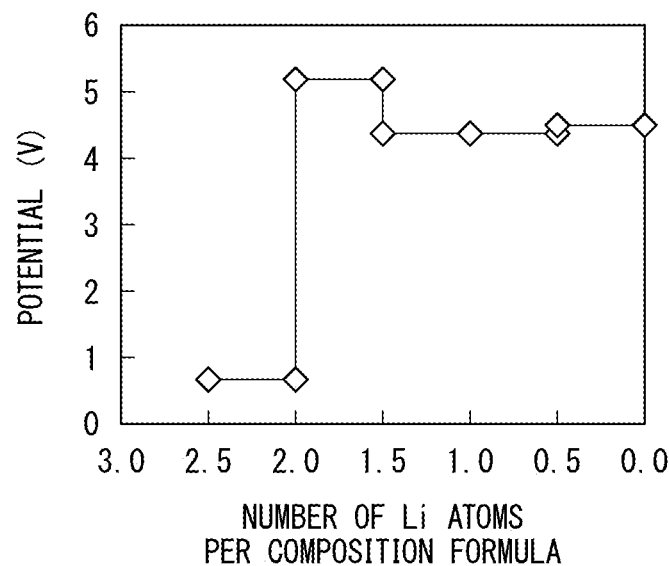
FIG. 2A is a diagram showing characteristics of a solid electrolyte in which a part of zirconium contained in the solid electrolyte is substituted with calcium that is an element with an invariable valence.
Figure 2B:
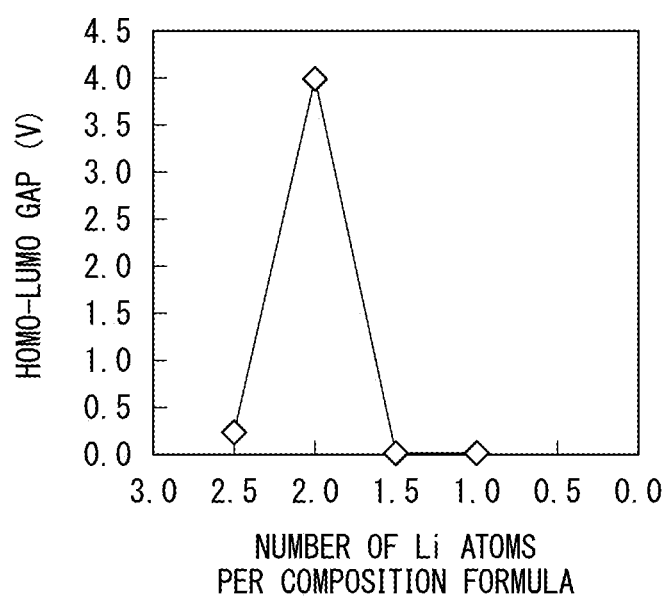
FIG. 2B is a diagram showing characteristics of a solid electrolyte in which a part of zirconium contained in the solid electrolyte is substituted with calcium that is an element with an invariable valence.
Figure 2C:
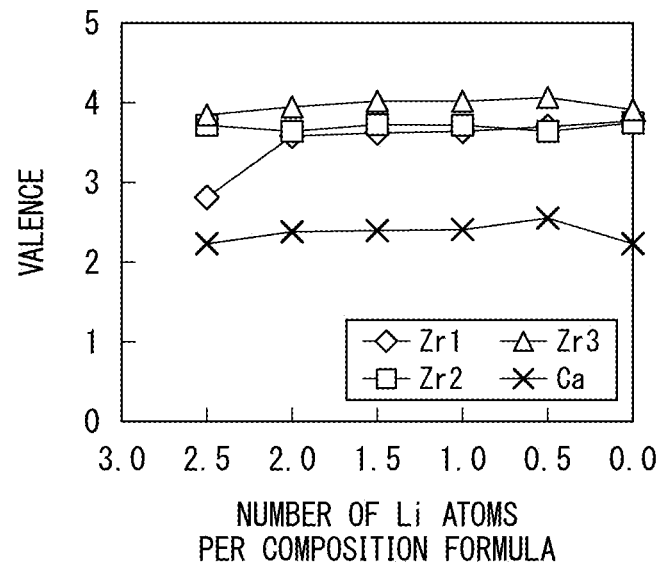
FIG. 2C is a diagram showing characteristics of a solid electrolyte in which a part of zirconium contained in the solid electrolyte is substituted with calcium that is an element with an invariable valence.
Figure 2D:
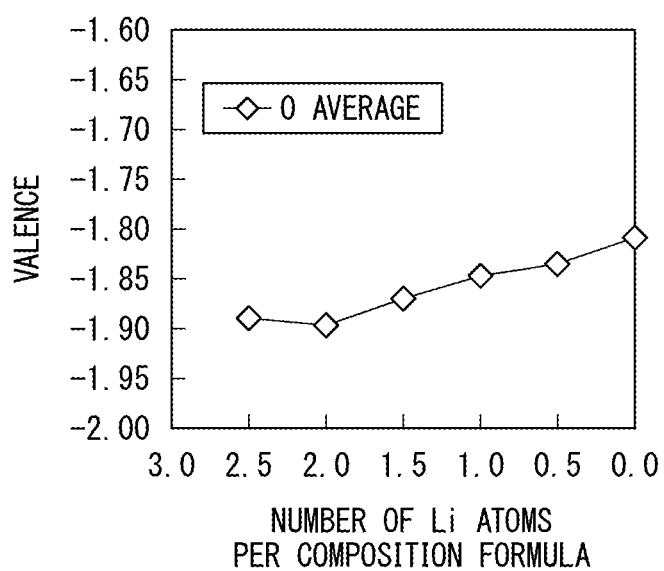
FIG. 2D is a diagram showing characteristics of a solid electrolyte in which a part of zirconium contained in the solid electrolyte is substituted with calcium that is an element with an invariable valence.

FIG. 2A is a diagram showing a change in potential when the number of Li atoms per composition formula changes, FIG. 2B is a diagram showing a size of a HOMO-LUMO gap of the solid electrolyte with respect to the number of Li atoms per composition formula, FIG. 2C is a diagram showing changes in valences of zirconium and calcium contained in the solid electrolyte when the number of Li atoms per composition formula changes, and FIG. 2D is a diagram showing a change in valence of oxygen contained in the solid electrolyte when the number of Li atoms per composition formula changes. Zr1, Zr2, and Zr3 mean sites where zirconium is present in a crystal structure.

In a case of substitution with calcium as shown in FIG. 2B, the highest occupied orbital (HOMO)-the lowest unoccupied orbital (LUMO) gap of the solid electrolyte suddenly decreases merely by the number of Li atoms per composition formula slightly deviating from 2.0. The fact that the HOMO-LUMO gap decreases means that it becomes impossible for the solid electrolyte to maintain electronic insulation.

The HOMO-LUMO gap suddenly decreases because electrons derived from zirconium and oxygen forming the basic skeleton of the solid electrolyte are used for charge compensation at the time of charging and discharging. If the electrons derived from zirconium and oxygen forming the basic skeleton are used for charge compensation, carriers are supplied into the solid electrolyte, and the solid electrolyte cannot maintain electronic insulation.

It is possible to confirm from FIGS. 2C and 2D that electrons derived from zirconium and oxygen forming the basic skeleton of the solid electrolyte are used for charge compensation at the time of charging and discharging. In FIG. 2C, the valence of Zr1 suddenly changes substantially when the number of Li atoms contained in the solid electrolyte exceeds 2.0. Also, in FIG. 2D, the valence of oxygen changes substantially when the number of Li atoms contained in the solid electrolyte falls below 2.0. That is, it is possible to state that electrons derived from zirconium and oxygen are used for charge compensation at the time of charging and discharging. This leads to a decrease in electronic insulation.

The solid electrolyte in the all-solid secondary battery contributes to exchange of mobile ions between the positive electrode and the negative electrode. In addition, the electrons move between the positive electrode and the negative electrode via the terminal electrodes and external terminals. Since electrons to move between the positive electrode and the negative electrode via the terminal electrodes and the external terminals move through the solid electrolyte if it is not possible to maintain electronic insulation of the solid electrolyte, the all-solid secondary battery cannot maintain a charged state even if exchange of electrons with the external circuits is blocked.

The solid electrolyte in which a part of zirconium contained in the solid electrolyte is substituted with calcium that is an element with an invariable valence can maintain electronic insulation only when the number of Li atoms per composition formula is about 2.0.

Meanwhile, FIGS. 3A to 3D are diagrams showing characteristics of the solid electrolyte 3 according to the embodiment. In the solid electrolyte 3, a part of zirconium is substituted with manganese with a variable valence. The solid electrolyte 3 described here is represented as a formula $Li_{1+0.5x}Mn_{0.5}Zr_{1.5}(PO_4)_3$.

Figure 3A:
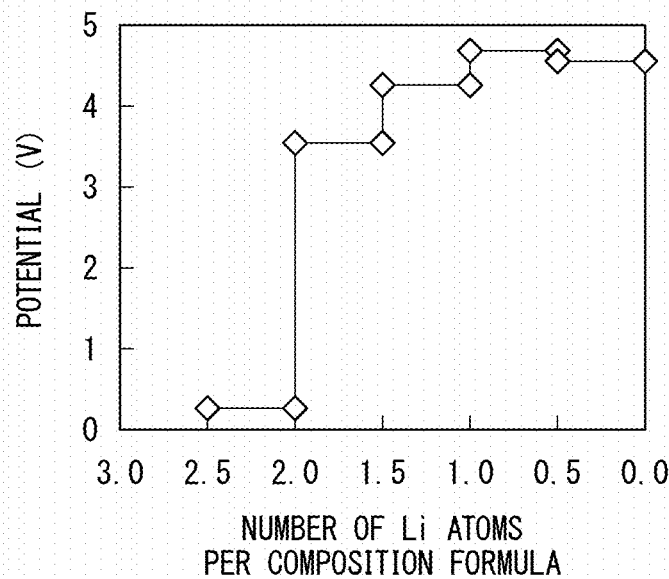
FIG. 3A is a diagram showing characteristics of a solid electrolyte according to the embodiment in which a part of zirconium contained in the solid electrolyte is substituted with manganese that is an element with a variable valence.
Figure 3B:
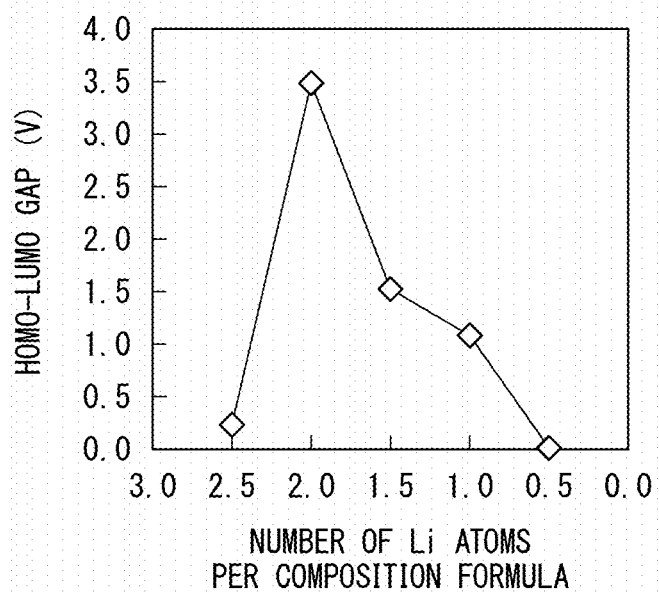
FIG. 3B is a diagram showing characteristics of the solid electrolyte according to the embodiment in which a part of zirconium contained in the solid electrolyte is substituted with manganese that is an element with a variable valence.
Figure 3C:
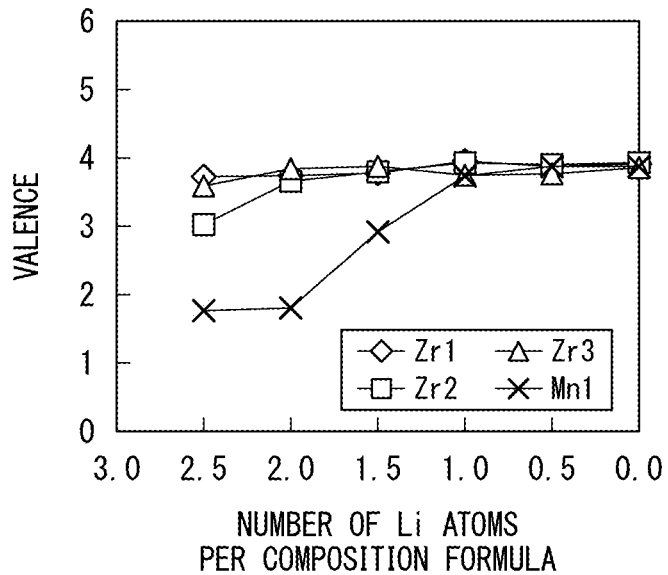
FIG. 3C is a diagram showing characteristics of the solid electrolyte according to the embodiment in which a part of zirconium contained in the solid electrolyte is substituted with manganese that is an element with a variable valence.
Figure 3D:
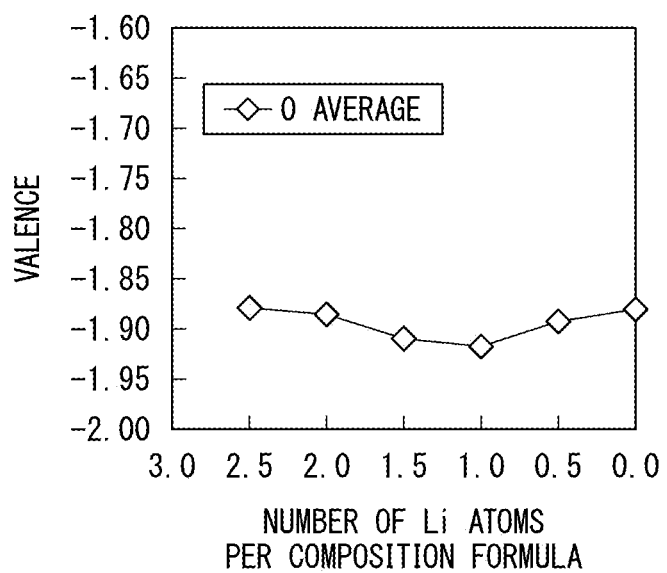
FIG. 3D is a diagram showing characteristics of the solid electrolyte according to the embodiment in which a part of zirconium contained in the solid electrolyte is substituted with manganese that is an element with a variable valence.

FIG. 3A is a diagram showing a change in potential when the number of Li atoms per composition formula changes, FIG. 3B is a diagram showing a size of a HOMO-LUMO gap of the solid electrolyte 3 with respect to the number of Li atoms per composition formula, FIG. 3C is a diagram showing changes in valences of zirconium and manganese contained in the solid electrolyte 3 when the number of Li atoms per composition formula changes, and FIG. 3D is a diagram showing a change in valence of oxygen contained in the solid electrolyte 3 when the number of Li atoms per composition formula changes.

In a case of substitution with manganese as shown in FIG. 3B, the solid electrolyte 3 maintains a HOMO-LUMO gap of equal to or greater than 0.5 eV in a wide range in which the number of Li atoms per composition formula is about 0.7 to about 2.4, and electronic insulation is maintained. This is because substituting element with a variable valence contributes to charge compensation at the time of charging and discharging and prevents electrons derived from zirconium and oxygen forming the basic skeleton of the solid electrolyte 3 from being used for charge compensation at the time of charging and discharging.

In FIG. 3C, the valence of manganese significantly changes while valences of Zr1 to Zr3 do not significantly vary in the range in which the number of Li atoms per composition formula is from about 0.7 to about 2.4. Also, in FIG. 3D, the valence of oxygen also does not significantly vary in the range in which the number of Li atoms per composition formula is from about 0.7 to about 2.4. That is, since manganese with a variable valence is in charge of charge compensation and no carriers are supplied into the solid electrolyte 3, the solid electrolyte 3 can maintain electronic insulation.

As a result, the all-solid secondary battery using the solid electrolyte 3 according to the embodiment can still appropriately work even if the number of Li atoms per composition formula significantly changes.

Figure 4:
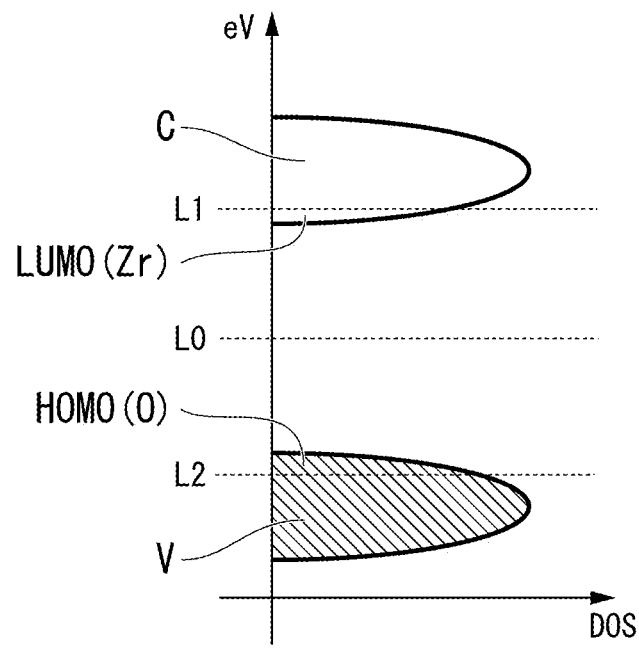
FIG. 4 is a schematic view of a band structure of a solid electrolyte that is substituted with an element with an invariable valence.

The aforementioned details can be described as follows from a viewpoint of a band structure of a solid electrolyte. FIG. 4 is a schematic view of a band structure of a solid electrolyte in which substitution with an element with an invariable valence is performed. As shown in FIG. 4, the solid electrolyte in which substitution with an element with an invariable valence is performed has the valence band V and the conduction band C. The valence band V includes levels derived from electron orbitals derived from oxygen forming the basic skeleton of the solid electrolyte, and the conduction band C includes levels derived from electron orbitals derived from zirconium forming the basic skeleton of the solid electrolyte.

In the solid electrolyte shown in FIG. 4, a level L0 corresponding to a Fermi level is present between a LUMO level and a HOMO level when the number of Li atoms is a specific number (2.0 per composition formula in FIGS. 2A to 2D). In this case, a band gap is present between the valence band V and the conduction band C, and the solid electrolyte maintains electronic insulation.

If Li is further added to the solid electrolyte from this case, the LUMO level receives electrons, and the level corresponding to the Fermi level moves from the position of L0 to the position of L1. Meanwhile, if Li comes out from the solid electrolyte, the HOMO level is oxidized. That is, holes enter the HOMO level, and the position of the Fermi level moves from the position indicated by the reference numeral L0 to the position indicated by the reference numeral L2. In both cases, the band structure becomes a metallic structure. As a result, electronic insulation of the solid electrolyte suddenly drops (FIG. 2B), and a range of the number of available Li becomes narrower (FIG. 2A).

Figure 5:
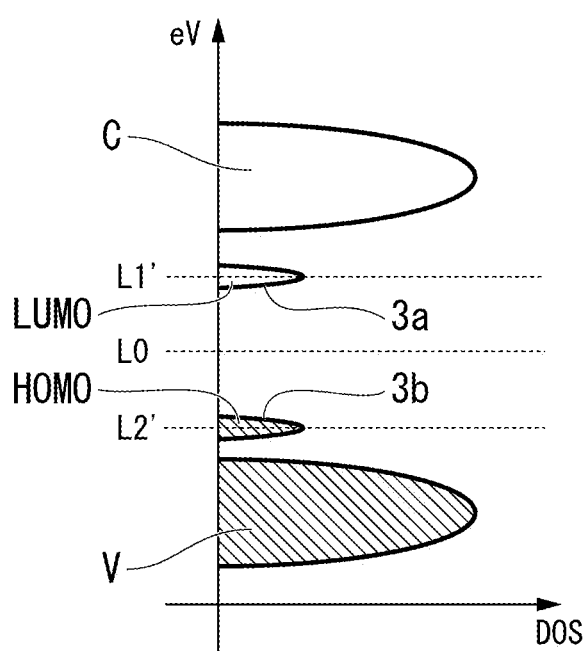
FIG. 5 is a schematic view of a band structure of a solid electrolyte 3 that is substituted with an element with a variable valence.

Meanwhile, FIG. 5 is a schematic view of a band structure of the solid electrolyte 3 according to the embodiment that is substituted with an element with a variable valence. As shown in FIG. 5, the solid electrolyte in which substitution with an element with a variable valence is performed has at least one of unoccupied impurity levels 3a that are not occupied by electrons and occupied impurity levels 3b that are occupied by electrons in a band gap between the valence band V and the conduction band C.

It is only necessary for the smaller one out of the energy difference between the highest level of energy in the occupied impurity levels and the LUMO level and the energy difference between the lowest level of energy in the unoccupied impurity levels and the HOMO level to be greater than 0.3 eV, and the smaller energy difference is preferably equal to or greater than 0.7 eV.

As shown in FIG. 5, if Li intrudes into the solid electrolyte in a state in which the level corresponding to the Fermi level is present at the position indicated by the reference numeral L0, the unoccupied impurity level 3a is first reduced, and electrons enter the unoccupied impurity level 3a (the position of the Fermi level moves from the position indicated by the reference numeral L0 to the position indicated by the reference numeral L1'). Meanwhile, if electrons come off from the solid electrolyte in a situation where the Fermi level is present at the position indicated by the reference numeral L0, the occupied impurity level is first oxidized, and holes enter the occupied impurity level 3b (the position of the Fermi level moves from the position indicated by the reference numeral L0 to the position indicated by the reference numeral L2').

It is possible to prevent the electrons that have once entered the unoccupied impurity level 3a from being shifted to the conduction band C since the energy difference between the highest level 3a of energy in the occupied impurity levels (that has been turned into the occupied impurity level as a result of the reduction) and the LUMO level is sufficiently large. Also, it is possible to prevent the holes that have once entered the occupied impurity level 3b from being shifted to the valence band V since the energy difference between the lowest level 3b of energy in the unoccupied impurity levels (that has been turned into the unoccupied impurity level as a result of the oxidation) and the HOMO level is sufficiently large.

Therefore, an energy gap is kept between the highest level 3a of energy in the occupied impurity levels (that has been turned into the occupied impurity level as a result of the reduction) and the LUMO level or between the lowest level 3b of energy in the unoccupied impurity levels (that has been turned into the unoccupied impurity level as a result of the oxidation) and the HOMO level. As a result, the solid electrolyte 3 can maintain electronic insulation (FIG. 3B), and the range of the number of available Li for charge and discharge becomes wider (FIG. 3A).

In the solid electrolyte 3 according to the embodiment, it is possible to prevent electrons derived from zirconium and oxygen forming the basic skeleton from being used for charge compensation at the time of charging and discharging, to desorb and insert Li while keeping electronic insulation by a part of phosphorus or zirconium being substituted with an element with a variable valence, and thereby to have some capacity.

As the element with a variable valence with which a part of phosphorus or zirconium in the solid electrolyte 3 is substituted, it is possible to use at least one selected from the group consisting of Ti, V, Cr, Mn, Fe, Co, Ni, Cu, Zn, Nb, Sb, Ta, Bi, Mo, Te, W, and Se. If substitution with these elements is performed, it is possible to support charge compensation at the time of charging and discharging since any of these elements have variable valences.

In a case in which a part of zirconium is substituted with an element with a variable valence, the element with a variable valence is preferably at least one selected from the group consisting of Mn, Ni, Te, and W. In a case in which a part of phosphorus is substituted with an element with a variable valence, the element with a variable valence is preferably at least one selected from the group consisting of Cr, Mn, Fe, W, Se, Sb, and Te.

If a part of zirconium or phosphorus in the solid electrolyte 3 is substituted with these elements, both the unoccupied impurity levels 3a and the occupied impurity levels 3b are formed in band gaps of the valence band V and the conduction band C, respectively.

As described above, the unoccupied impurity level 3a is used for charge compensation at the time of discharging, and the occupied impurity level 3b is used for charge compensation at the time of charging. The solid electrolyte 3 can maintain electronic insulation both at the time of charging and at the time of discharging by the solid electrolyte 3 having the unoccupied impurity level 3a and the occupied impurity level 3b with a satisfactory balance.

Also, the solid electrolyte 3 may specifically be a compound represented as Formula (1) below:

$$Li_xM1_yZr_{2-y}M2_zP_{3-z}O_{12} \quad (1)$$

M1 is a element with which a part of zirconium is substituted and is preferably at least one selected from the group consisting of Mn, Ni, Te, and W. M2 is a element with which a part of phosphorus is substituted and is preferably at least one selected from the group consisting of Cr, Mn, Fe, W, Se, Sb, and Te.

The amounts of Mn, Ni, Te, and W in M1 are assumed to be $y_{Mn}$, $y_{Ni}$, $y_{Te}$, and $y_W$, respectively, in this order, and the amounts of Cr, Mn, Fe, W, Se, Sb, and Te in M2 are assumed to be $z_{Cr}$, $z_{Mn}$, $z_{Fe}$, $z_W$, $z_{Se}$, $z_{Sb}$, and $z_{Te}$, respectively in this order. In this case, the respective contents satisfy Relationship Formula (2) to (4) below:

$$1+2y_{Ni}-2y_W-2y_{Te}-z_{Cr}+2z_{Mn}-2z_{Fe}-z_W-z_{Se}-z_{Te} \leq x \leq 1+ \\ 2y_{Mn}+3y_{Ni}+y_W+2y_{Te}+z_{Cr}+3z_{Mn}+3z_{Fe}+5z_W+2z_{Se}+ \\ z_{Sb}+z_{Te} \quad (2)$$

$$0 \leq y < 1 \quad (3)$$

$$0 \leq z < 1.5 \quad (4) \text{ (except for } y=z=0)$$

<Positive Electrode Layer and Negative Electrode Layer>

As shown in FIG. 1, the positive electrode layer 1 has a positive electrode current collector layer 1A and a positive electrode active material layer 1B that contains a positive electrode active material. The negative electrode layer 2 has a negative electrode current collector layer 2A and a negative electrode active material layer 2B that contains a negative electrode active material.

The positive electrode current collector layer 1A and the negative electrode current collector layer 2A preferably have high electronic conductivity. Therefore, it is preferable to use, for example, silver, palladium, gold, platinum, aluminum, copper, nickel, and the like for the positive electrode current collector layer 1A and the negative electrode current collector layer 2A. Among these substances, copper does not easily react with the positive electrode active material, the negative electrode active material, and the solid electrolyte. Therefore, if copper is used for the positive electrode current collector layer 1A and the negative electrode current collector layer 2A, it is possible to reduce internal resistance of the all-solid secondary battery 10. Note that substances that are contained in the positive electrode current collector layer 1A and the negative electrode current collector layer 2A may be the same or different from each other.

The positive electrode active material layer 1B is formed on one surface or both surfaces of the positive electrode current collector layer 1A. In a case in which the positive electrode layer 1 out of the positive electrode layer 1 and the negative electrode layer 2 is formed in the uppermost layer of the layered body 4 in the lamination direction, for example, there is no facing negative electrode layer 2 on the positive electrode layer 1 located in the uppermost layer. Therefore, the positive electrode active material layer 1B may be provided only on one surface on the lower side of the positive electrode layer 1 located in the uppermost layer in the lamination direction.

The negative electrode active material layer 2B is also formed on one surface or both surfaces of the negative electrode current collector layer 2A similarly to the positive electrode active material layer 1B. Also, in a case in which the negative electrode layer 2 out of the positive electrode layer 1 and the negative electrode layer 2 is formed in the lowermost layer of the layered body 4 in the lamination direction, for example, the negative electrode active material layer 2B may be provided only on one surface on the upper side of the negative electrode layer 2 located in the lowermost layer in the lamination direction.

The positive electrode active material layer 1B and the negative electrode active material layer 2B contain a positive electrode active material and a negative electrode active material that exchange electrons, respectively. In addition to them, the positive electrode active material layer 1B and the negative electrode active material layer 2B may contain an electroconductive aid, a binder, and the like. The positive electrode active material and the negative electrode active material are preferably adapted such that mobile ions are efficiently inserted and desorbed.

For the positive electrode active material and the negative electrode active material, it is preferable to use, for example, a transition metal oxide or a transition metal composite oxide. Specifically, it is possible to use a lithium-manganese composite oxide $Li_2Mn_aMa_{1-a}O_3$ (0.8≤a≤1, Ma=Co, Ni), lithium cobaltate ($LiCoO_2$), lithium nickelate ($LiNiO_2$), lithium manganese spinel ($LiMn_2O_4$), a composite metal oxide represented as $LiNi_xCo_yMn_zO_2$ (x+y+z=1, 0≤x≤1, 0≤y≤1, 0≤z≤1), a lithium vanadium compound ($LiV_2O_5$), olivine-type $LiMbPO_4$ (where Mb is one or more kinds of element selected from Co, Ni, Mn, Fe, Mg, Nb, Ti, Al, and Zr), lithium vanadium phosphate ($Li_3V_2(PO_4)_3$ or $LiVOPO_4$), an Li excess solid solution represented as $Li_2MnO_3$-$LiMcO_2$ (Mc=Mn, Co, Ni), lithium titanate ($Li_4Ti_5O_{12}$), a composite metal oxide represented as $Li_sNi_tCo_uAl_vO_2$ (0.9<s<1.3, 0.9<t+u+v<1.1), or the like.

There is no clear distinction between which is the positive electrode active materials or the negative electrode active materials that are included in the positive electrode active material layer 1B and the negative electrode active material layer 2B. It is possible to use a compound with a superior potential as a positive electrode active material and to use a compound with an inferior potential as a negative electrode active material by comparing potentials of two kinds of compound.

The positive electrode current collector layer 1A and the negative electrode current collector layer 2A may contain a positive electrode active material and a negative electrode active material, respectively. The amount of the active materials contained in the respective current collector layers is not particularly limited as long as the active materials function as current collectors. For example, the positive electrode current collector/the positive electrode active material or the negative electrode current collector/negative electrode active material preferably falls within a range of 90/10 to 70/30 in terms of volume ratio.

Adhesiveness between the positive electrode current collector layer 1A and the positive electrode active material layer 1B and between the negative electrode current collector layer 2A and the negative electrode active material layer 2B is improved by the positive electrode current collector layer 1A and the negative electrode current collector layer 2A containing the positive electrode active material and the negative electrode active material, respectively.

(Terminal Electrode)

The terminal electrodes 5 and 6 are formed such that they are in contact with side surfaces of the layered body 4 (surfaces from which the end surfaces of the positive electrode layer 1 and the negative electrode layer 2 are exposed) as shown in FIG. 1. The terminal electrodes 5 and 6 are connected to external terminals and are in charge of exchanging electrons with the layered body 4.

For the terminal electrodes 5 and 6, it is preferable to use a material with high electronic conductivity. For example, it is possible to use silver, gold, platinum, aluminum, copper, tin, nickel, gallium, indium, alloys thereof, or the like.

"Method for Manufacturing all-Solid Secondary Battery"

(Method for Manufacturing Solid Electrolyte)

The solid electrolyte 3 can be produced using a solid phase reaction method or the like. Specifically, the solid electrolyte 3 can be produced by mixing and sintering a compound containing phosphorous and zirconium forming the basic skeleton with a compound containing a substituting element. The amount of elements to be substituted, substitution sites, and the like can be controlled by adjusting the molar ratio at the time of the mixing.

The composition of the solid electrolyte 3 can be checked using X-ray fluorescence analysis (XRF) or high-frequency inductively coupled plasma optical emission spectroscopy (ICP).

(Formation of Layered Body)

As a method for forming the layered body 4, a simultaneous sintering method may be used, or a sequential sintering method may be used.

The simultaneous sintering method is a method of laminating materials that form the respective layers and producing the layered body through collective sintering. The sequential sintering method is a method of producing the respective layers in order and performing a sintering process every time each layer is produced. It is possible to form the layered body 4 in a smaller number of operation processes in a case of using the simultaneous sintering method than in a case of using the sequential sintering method. Also, the obtained layered body 4 becomes finer in the case of using the simultaneous sintering method than in the case of using the sequential sintering method. Hereinafter, an exemplary case in which the layered body 4 is manufactured using the simultaneous sintering method will be described.

The simultaneous sintering method has a process of producing pastes of the respective materials that are included in the layered body 4, a process of applying the respective pastes to a base material and drying the pastes producing green sheets, a process of obtaining a layered sheet by laminating the green sheets and, a process of simultaneously sintering the layered sheet.

First, the respective materials for the positive electrode current collector layer 1A, the positive electrode active material layer 1B, the solid electrolyte 3, the negative electrode active material layer 2B, and the negative electrode current collector layer 2A that are included in the layered body 4 are prepared in the form of pastes.

A method of preparing the respective materials in the form of pastes is not particularly limited. For example, pastes may be obtained by mixing powder of the respective materials into vehicles. Here, the vehicles collectively refer to mediums in a liquid phase. The vehicles contain solvents and binders.

The paste for the positive electrode current collector layer 1A, the paste for the positive electrode active material layer 1B, the paste for the solid electrolyte 3, the paste for the negative electrode active material layer 2B, and the paste for the negative electrode current collector layer 2A are produced by such a method.

Then, green sheets are produced. The green sheets are obtained by applying the produced pastes to base materials such as polyethylene terephthalate (PET) films or the like, drying the pastes as needed, and peeling off the base materials. A method of applying the pastes is not particularly limited. For example, a known method such as screen printing, application, transferring, or a doctor blade can be employed.

Next, the respectively produced green sheets are stacked in accordance with a desired order and the number of layers to be laminated, thereby obtaining a layered sheet. When the green sheets are laminated, alignment, cutting, or the like is performed as needed. In a case in which a parallel or serial battery is produced, for example, it is preferable to perform alignment and stack the green sheets such that the end surface of the positive electrode current collector layer does not conform to the end surface of the negative electrode current collector layer.

The layered sheet may be produced using a method of producing a positive electrode active material layer unit and a negative electrode active material layer unit, which will be described later, and laminating the positive electrode active material layer unit and the negative electrode active material layer unit.

First, the paste for the solid electrolyte 3 is applied to a base material such as a PET film by a doctor blade method and is then dried, thereby forming the solid electrolyte 3 in the form of a sheet. Next, the paste for the positive electrode active material layer 1B is printed on the solid electrolyte 3 by screen printing and is then dried, thereby forming the positive electrode active material layer 1B. Then, the paste for the positive electrode current collector layer 1A is printed on the positive electrode active material layer 1B by screen printing and is then dried, thereby forming the positive electrode current collector layer 1A. Further, the paste for the positive electrode active material layer 1B is printed on the positive electrode current collector layer 1A by screen printing and is then dried, thereby forming the positive electrode active material layer 1B.

Thereafter, the PET film is peeled off, thereby obtaining the positive electrode active material layer unit. The positive electrode active material layer unit is a layered sheet in which the solid electrolyte 3, the positive electrode active material layer 1B, the positive electrode current collector layer 1A, and the positive electrode active material layer 1B are laminated in this order.

The negative electrode active material layer unit is produced in a similar procedure. The negative electrode active material layer unit is a layered sheet in which the solid electrolyte 3, the negative electrode active material layer 2B, the negative electrode current collector layer 2A, and the negative electrode active material layer 2B are laminated in this order.

Next, one positive electrode active material layer unit and one negative electrode active material layer unit are laminated. At this time, the positive electrode active material layer unit and the negative electrode active material layer unit are laminated such that the solid electrolyte 3 in the positive electrode active material layer unit is brought into contact with the negative electrode active material layer 2B in the negative electrode active material layer unit or the positive electrode active material layer 1B in the positive electrode active material layer unit is brought into contact with the solid electrolyte 3 in the negative electrode active material layer unit. In this manner, the layered sheet in which the positive electrode active material layer 1B, the positive electrode current collector layer 1A, the positive electrode active material layer 1B, the solid electrolyte 3, the negative electrode active material layer 2B, the negative electrode current collector layer 2A, the negative electrode active material layer 2B, and the solid electrolyte 3 are laminated in this order is obtained.

When the positive electrode active material layer unit and the negative electrode active material layer unit are laminated, the respective units are stacked in a deviating manner such that the positive electrode current collector layer 1A in the positive electrode active material layer unit extends only toward one end surface and the negative electrode current collector layer 2A in the negative electrode active material layer unit extends only toward the other surface. Thereafter, the sheet for the solid electrolyte 3 with a predetermined thickness is further stacked on the surface on a side on which the units are stacked and the solid electrolyte 3 is not present, thereby obtaining a layered sheet.

Next, the produced layered sheets are collectively pressure-bonded to each other. The pressure-bonding is preferably performed while the layered sheets are heated. The heating temperature at the time of the pressure-bonding is set to 40 to 95° C., for example.

Debinding is performed by heating the pressure-bonded layered sheet to 500° C. to 750° C. in a nitrogen, hydrogen, and water vapor atmosphere, for example. Thereafter, the layered sheet is collectively subject to simultaneous sintering, thereby obtaining the layered body 4 that is a sintered body. The sintering of the layered sheet is performed by heating the layered sheet to 600° C. to 1000° C. in a nitrogen, hydrogen, and water vapor atmosphere, for example. The sintering time is, for example, 0.1 to 3 hours.

In the layered body 4 that is a sintered body, relative density of the active material and the solid electrolyte may be equal to or greater than 80%. Mobile ion dispersion paths in a crystal are more easily connected, and ionic conductivity is enhanced as the relative density is higher.

In the layered body 4 that is a sintered body, an intermediate layer formed through element mutual dispersion may be included between the electrode layer and the solid electrolyte layer. It is possible to reduce the interface resistance between different materials by including the intermediate layer.

In the layered body that is a sintered body, the electrolyte layer may have a core-shell structure that has a core region and a shell region with different metal ion concentrations or oxygen ion concentrations. It is possible to enhance electronic conductivity by having the core-shell structure.

The obtained sintered body (layered body 4) may be subject to barrel polishing by being placed in a cylindrical container along with a polishing material such as alumina. In this manner, it is possible to chamber corners of the layered body 4. In another method, the layered body 4 may be polished through sand blasting. This method is preferable since only a specific portion can be ground.

The terminal electrodes 5 and 6 are formed at ends of the layered body 4 produced in the aforementioned procedure, thereby producing the all-solid secondary battery. The terminal electrodes 5 and 6 can be produced by means such as sputtering.

As described above, the all-solid secondary battery according to the embodiment has a large capacity. The capacity becomes large since the solid electrolyte 3 is adapted such that Li can be intercalated and deintercalated while electronic insulation is maintained.

Although the embodiments of the invention have been described above in detail with reference to the drawings, the respective configurations, combinations thereof, and the like in the respective embodiments are just examples, and addition, omission, replacement, and other modification of configurations can be made without departing from the gist of the invention.

EXAMPLES

"Changes in Characteristics of Solid Electrolyte in Charging and Discharging"

As shown in FIGS. 2A to 2D and FIGS. 3A to 3D, characteristics of the solid electrolyte when the number of Li atoms per composition formula were caused to change were checked by measuring a potential of the solid electrolyte, a HOMO-LUMO gap of the solid electrolyte, and changes in valences of elements contained in the solid electrolyte. The measurement results corresponded to changes in characteristics of the solid electrolyte when the all-solid secondary battery was charged and discharged. These electron states can be measured by systematically examining the electron states through a UV-Vis spectrum or ultraviolet photoelectron spectroscopy (UPS) and inverse photoelectron spectroscopy (IPES) while changing compositions according to an experimental method. According to a simulation, the electron states can be measured by a first-principle simulation using a Vienna Ab initio Simulation Package (VASP), wien2k, PHASE, CASTEP, or the like. The electron states were measured through the first principle simulation using a Vienna Ab initio Simulation Package (VASP) this time.

Example 1-1

Figure 6A:
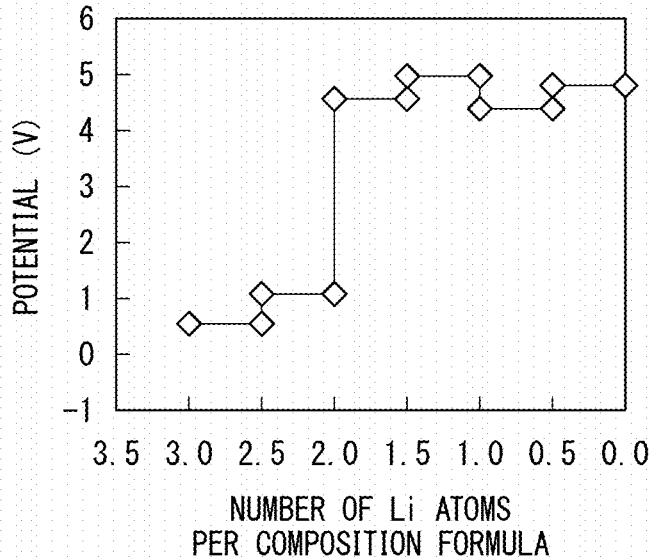
FIG. 6A is a diagram of a measured change in characteristics in $Li_{1+0.5x}Ni_{0.5}Zr_{1.5}(PO_4)_3$ in which a part of zirconium in $LiZr_2(PO_4)_3$ is substituted with nickel.
Figure 6B:
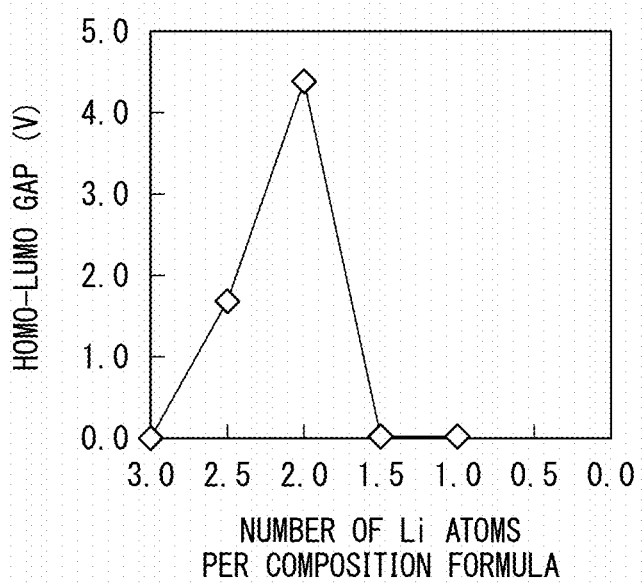
FIG. 6B is a diagram of a measured change in characteristics in $Li_{1+0.5x}Ni_{0.5}Zr_{1.5}(PO_4)_3$ in which a part of zirconium in $LiZr_2(PO_4)_3$ is substituted with nickel.
Figure 6C:
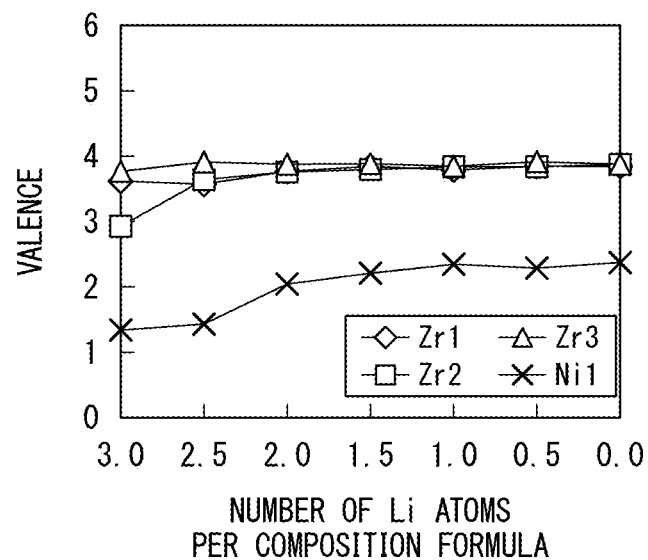
FIG. 6C is a diagram of a measured change in characteristics in $Li_{1+0.5x}Ni_{0.5}Zr_{1.5}(PO_4)_3$ in which a part of zirconium in $LiZr_2(PO_4)_3$ is substituted with nickel.
Figure 6D:
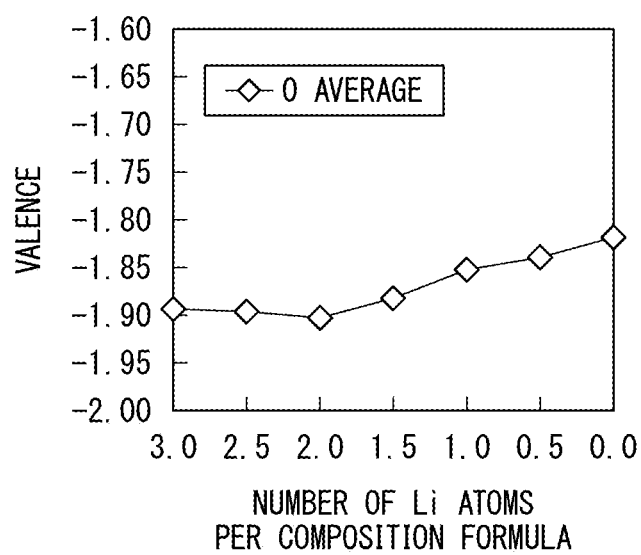
FIG. 6D is a diagram of a measured change in characteristics in $Li_{1+0.5x}Ni_{0.5}Zr_{1.5}(PO_4)_3$ in which a part of zirconium in $LiZr_2(PO_4)_3$ is substituted with nickel.

In Example 1-1, changes in characteristics of $Li_{1+0.5x}Ni_{0.5}Zr_{1.5}(PO_4)_3$ in which a part of zirconium of $LiZr_2(PO_4)_3$ was substituted with nickel were measured. The results are shown in FIGS. 6A to 6D. FIG. 6A is a diagram showing changes in potential when the number of Li atoms per composition formula changed, FIG. 6B is a diagram showing a size of a HOMO-LUMO gap of the solid electrolyte with respect to the number of Li atoms per composition formula, FIG. 6C is a diagram showing changes in valences of zirconium and nickel contained in the solid electrolyte when the number of Li atoms per composition formula changed, and FIG. 6D is a diagram showing a change in valence of oxygen contained in the solid electrolyte when the number of Li atoms per composition formula changed.

As shown in FIG. 6B, the solid electrolyte maintained electronic insulation within a range of the number of Li atoms from about 1.6 to about 2.8 in a case in which a part of zirconium was substituted with nickel. This was also able to be confirmed from the fact that the valences of zirconium and oxygen shown in FIGS. 6C and 6D did not significantly change with respect to variations in the number of Li atoms. Also, as shown in FIG. 6A, the solid electrolyte in Example 1-1 had a potential window of about 4 V, and a potential window did not significantly become narrow.

Example 1-2

Figure 7A:
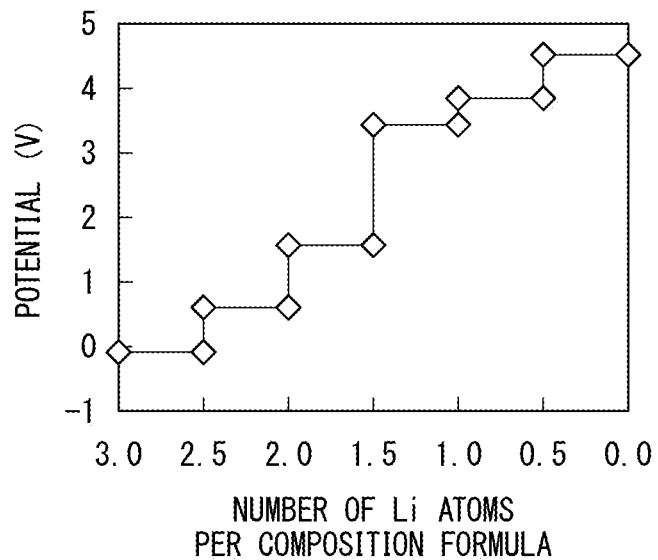
FIG. 7A is a diagram of a measured change in characteristics in $Li_{1+0.5x}V_{0.5}Zr_{1.5}(PO_4)_3$ in which a part of zirconium in $LiZr_2(PO_4)_3$ is substituted with vanadium.
Figure 7B:
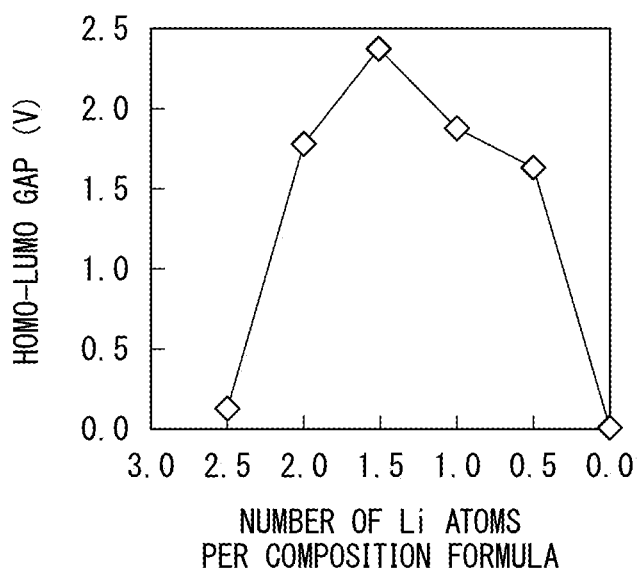
FIG. 7B is a diagram of a measured change in characteristics in $Li_{1+0.5x}V_{0.5}Zr_{1.5}(PO_4)_3$ in which a part of zirconium in $LiZr_2(PO_4)_3$ is substituted with vanadium.
Figure 7C:
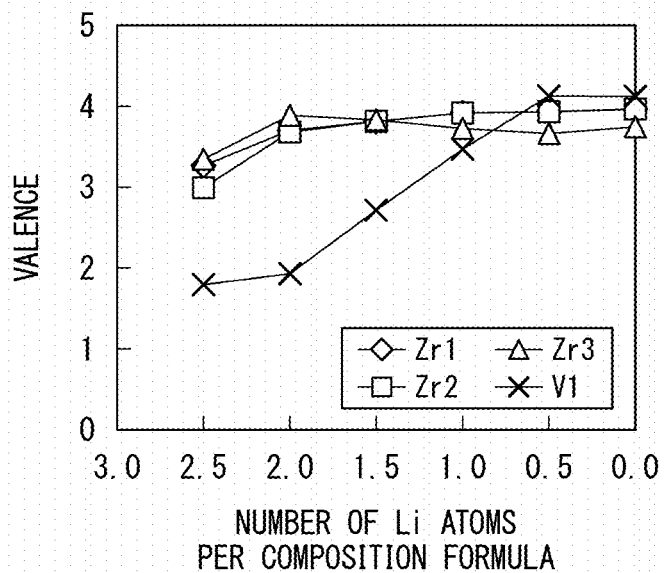
FIG. 7C is a diagram of a measured change in characteristics in $Li_{1+0.5x}V_{0.5}Zr_{1.5}(PO_4)_3$ in which a part of zirconium in $LiZr_2(PO_4)_3$ is substituted with vanadium.
Figure 7D:
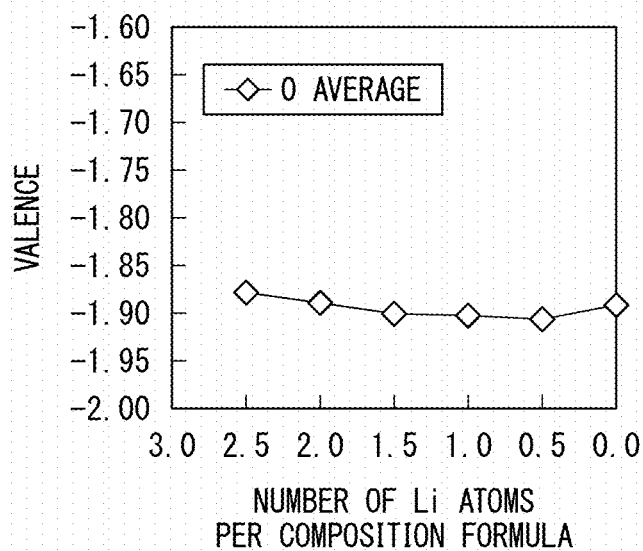
FIG. 7D is a diagram of a measured change in characteristics in $Li_{1+0.5x}V_{0.5}Zr_{1.5}(PO_4)_3$ in which a part of zirconium in $LiZr_2(PO_4)_3$ is substituted with vanadium.

In Example 1-2, changes in characteristics of $Li_{1+0.5x}V_{0.5}Zr_{1.5}(PO_4)_3$ in which a part of zirconium of $LiZr_2(PO_4)_3$ was substituted with vanadium were measured. The results are shown in FIGS. 7A to 7D. FIG. 7A is a diagram showing changes in potential when the number of Li atoms per composition formula changed, FIG. 7B is a diagram showing a size of a HOMO-LUMO gap of the solid electrolyte with respect to the number of Li atoms per composition formula, FIG. 7C is a diagram showing changes in valences of zirconium and vanadium contained in the solid electrolyte when the number of Li atoms per composition formula changed, and FIG. 7D is a diagram showing a change in valence of oxygen contained in the solid electrolyte when the number of Li atoms per composition formula changed.

As shown in FIG. 7B, the solid electrolyte maintained electronic insulation within a wide range of the number of Li atoms from about 0.2 to about 2.3 in a case in which a part of zirconium is substituted with vanadium. This was able to be confirmed from the fact that the valences of zirconium and oxygen shown in FIGS. 7C and 7D did not greatly change with respect to variations in the number of Li atoms. Also, as shown in FIG. 7A, the solid electrolyte in Example 1-2 had a potential window of about 4.5 V, and the potential window did not significantly become narrow.

Example 1-3

Figure 8A:
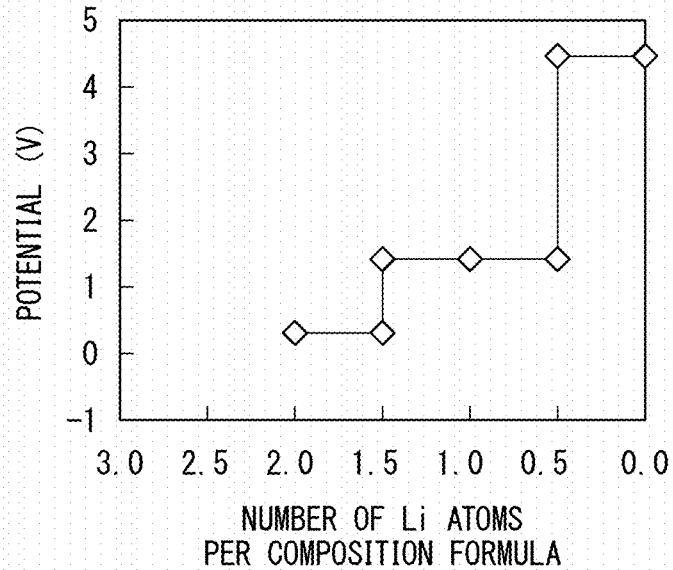
FIG. 8A is a diagram of a measured change in characteristics in $Li_{1+0.5x}Ta_{0.5}Zr_{1.5}(PO_4)_3$ in which a part of zirconium in $LiZr_2(PO_4)_3$ is substituted with tantalum.
Figure 8B:
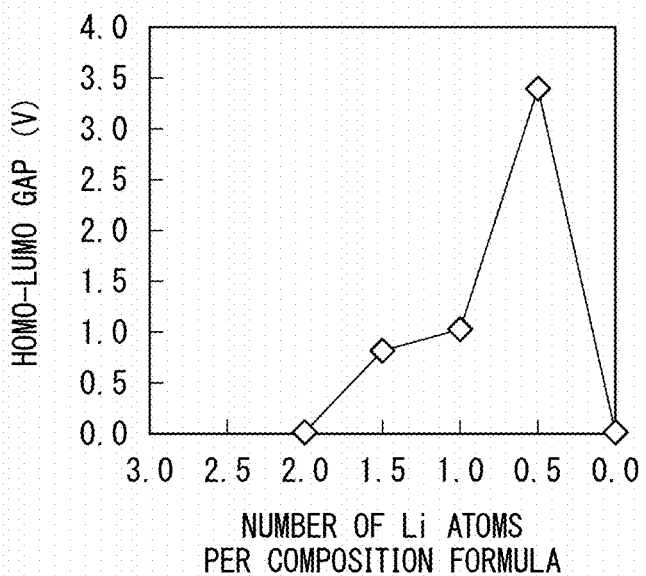
FIG. 8B is a diagram of a measured change in characteristics in $Li_{1+0.5x}Ta_{0.5}Zr_{1.5}(PO_4)_3$ in which a part of zirconium in $LiZr_2(PO_4)_3$ is substituted with tantalum.
Figure 8C:
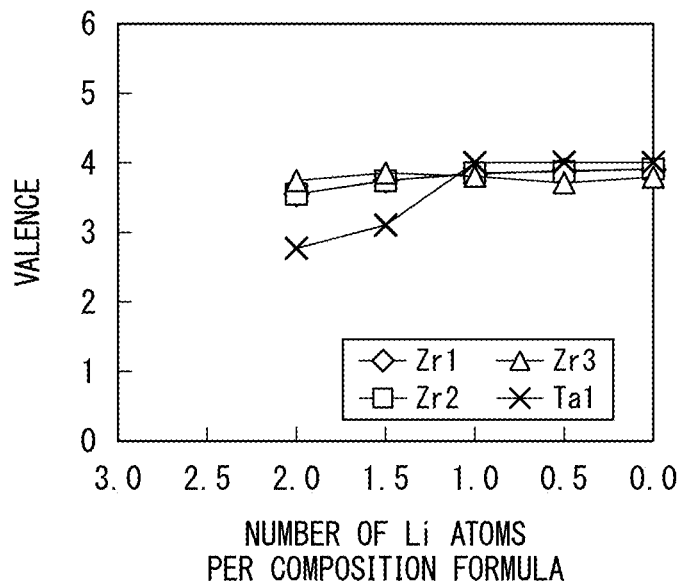
FIG. 8C is a diagram of a measured change in characteristics in $Li_{1+0.5x}Ta_{0.5}Zr_{1.5}(PO_4)_3$ in which a part of zirconium in $LiZr_2(PO_4)_3$ is substituted with tantalum.
Figure 8D:
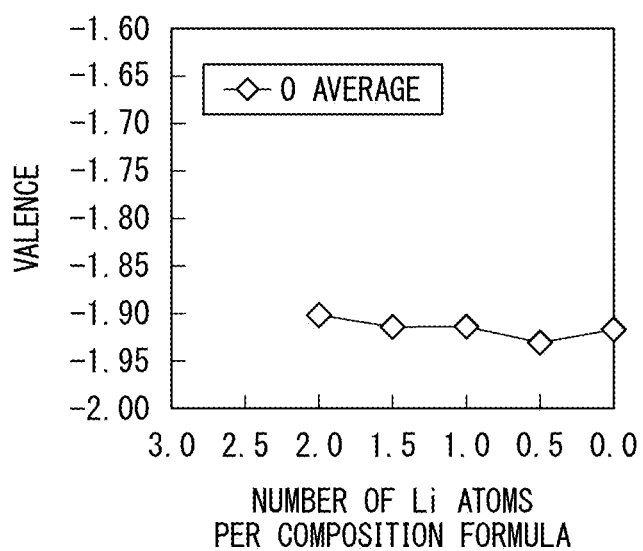
FIG. 8D is a diagram of a measured change in characteristics in $Li_{1+0.5x}Ta_{0.5}Zr_{1.5}(PO_4)_3$ in which a part of zirconium in $LiZr_2(PO_4)_3$ is substituted with tantalum.

In Example 1-3, changes in characteristics of $Li_{1+0.5x}Ta_{0.5}Zr_{1.5}(PO_4)_3$ in which a part of zirconium of $LiZr_2(PO_4)_3$ was substituted with tantalum were measured. The results are shown in FIGS. 8A to 8D. FIG. 8A shows a diagram showing a change in potential when the number of Li atoms per composition formula changed, FIG. 8B is a diagram showing a size of a HOMO-LUMO gap of the solid electrolyte with respect to the number of Li atoms per composition formula, FIG. 8C is a diagram showing changes in valences of zirconium and tantalum contained in the solid electrolyte when the number of Li atoms per composition formula changed, and FIG. 8D is a diagram showing a change in valence of oxygen contained in the solid electrolyte when the number of Li atoms per composition formula changed.

As shown in FIG. 8B, the solid electrolyte maintained electronic insulation within a range of the number of Li atoms from about 0.1 to about 1.7 in a case in which a part of zirconium was substituted with tantalum. This was also confirmed from the fact that the valences of zirconium and oxygen shown in FIGS. 8C and 8D did not greatly change with respect to variations in the number of Li atoms. Also, as shown in FIG. 8A, the solid electrolyte in Example 1-3 had a potential window of about 4 V, and the potential window did not significantly become narrow.

Example 1-4

Figure 9A:
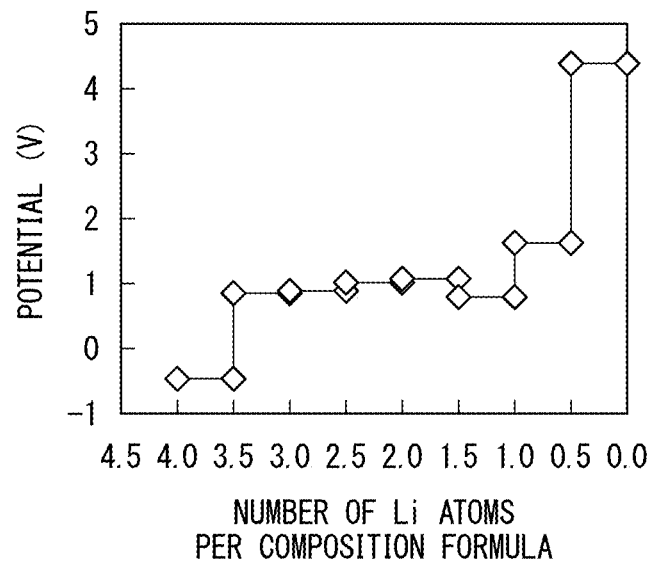
FIG. 9A is a diagram of a measured change in characteristics in $Li_{1+0.5x}Zr_2W_{0.5}P_{2.5}O_{12}$ in which a part of phosphorus in $LiZr_2(PO_4)_3$ is substituted with tungsten.
Figure 9B:
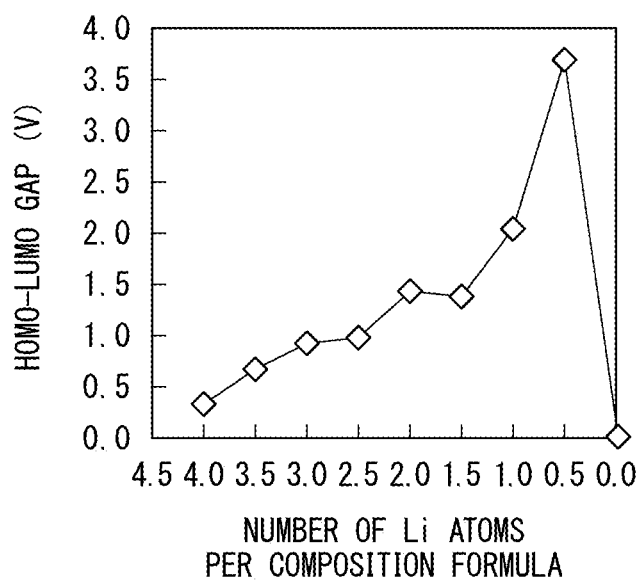
FIG. 9B is a diagram of a measured change in characteristics in $Li_{1+0.5x}Zr_2W_{0.5}P_{2.5}O_{12}$ in which a part of phosphorus in $LiZr_2(PO_4)_3$ is substituted with tungsten.
Figure 9C:
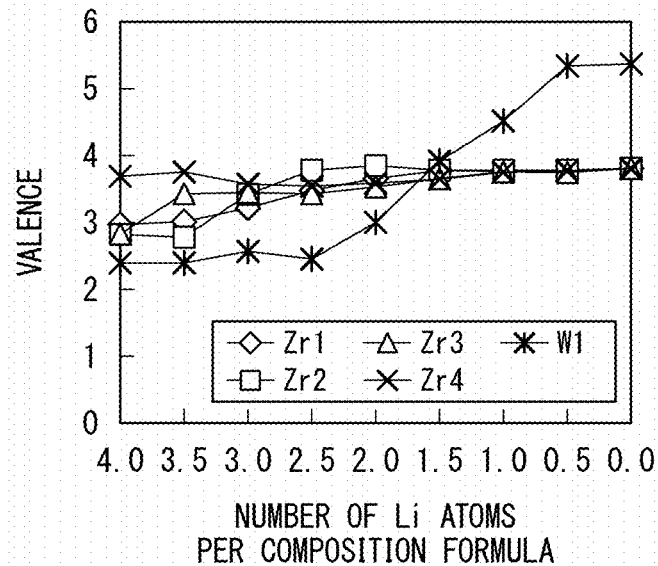
FIG. 9C is a diagram of a measured change in characteristics in $Li_{1+0.5x}Zr_2W_{0.5}P_{2.5}O_{12}$ in which a part of phosphorus in $LiZr_2(PO_4)_3$ is substituted with tungsten.
Figure 9D:
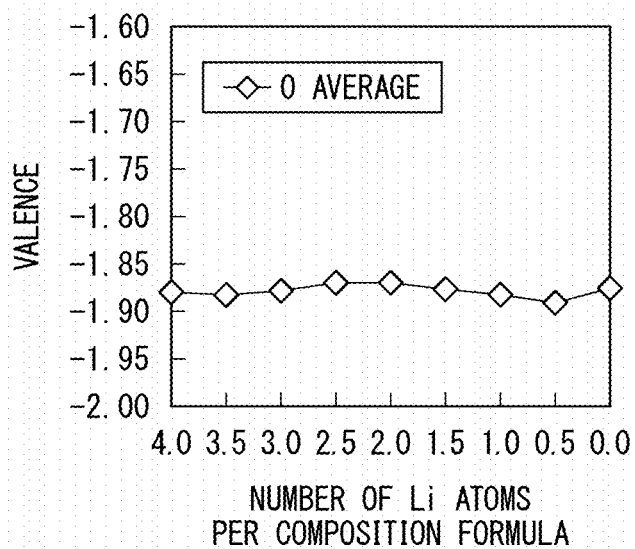
FIG. 9D is a diagram of a measured change in characteristics in $Li_{1+0.5x}Zr_2W_{0.5}P_{2.5}O_{12}$ in which a part of phosphorus in $LiZr_2(PO_4)_3$ is substituted with tungsten.

In Example 1-4, changes in characteristics of $Li_{1+0.5x}Zr_2W_{0.5}P_{2.5}O_{12}$ in which a part of phosphorous of $LiZr_2(PO_4)_3$ was substituted with tungsten were measured. The results are shown in FIGS. 9A to 9D. FIG. 9A is a diagram showing a change in potential when the number of Li atoms per composition formula changed, FIG. 9B is a diagram showing a size of a HOMO-LUMO gap of the solid electrolyte with respect to the number of Li atoms per composition formula, FIG. 9C is a diagram showing changes in valences of zirconium and tungsten contained in the solid electrolyte when the number of Li atoms per composition formula changed, and FIG. 9D is a diagram showing a change in valence of oxygen contained in the solid electrolyte when the number of Li atoms per composition formula changed.

As shown in FIG. 9B, the solid electrolyte maintained electronic insulation within a range of the number of Li atoms from about 0.2 to about 3.8 in a case in which a part of phosphorous was substituted with tungsten. This was also confirmed from the fact that the valences of zirconium and oxygen shown in FIGS. 9C and 9D did not greatly change with respect to variations in the number of Li atoms. Also, as shown in FIG. 9A, the solid electrolyte in Example 1-4 had a potential window of about 5 V, and the potential window did not significantly become narrow.

Example 1-5

Figure 10A:
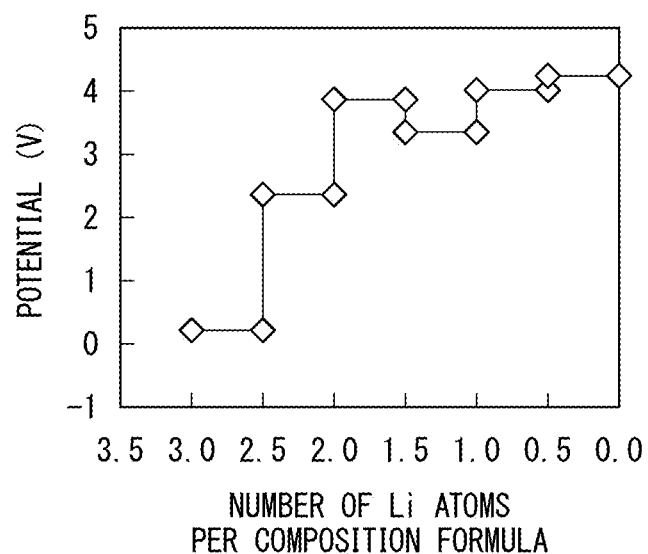
FIG. 10A is a diagram of a measured change in characteristics in $Li_{1+0.5x}Zr_2Mn_{0.5}P_{2.5}O_{12}$ in which a part of phosphorus in $LiZr_2(PO_4)_3$ is substituted with manganese.
Figure 10B:
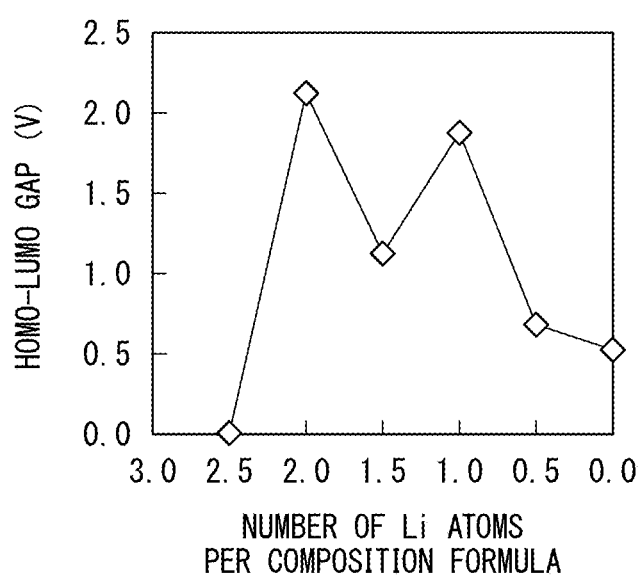
FIG. 10B is a diagram of a measured change in characteristics in $Li_{1+0.5x}Zr_2Mn_{0.5}P_{2.5}O_{12}$ in which a part of phosphorus in $LiZr_2(PO_4)_3$ is substituted with manganese.
Figure 10C:
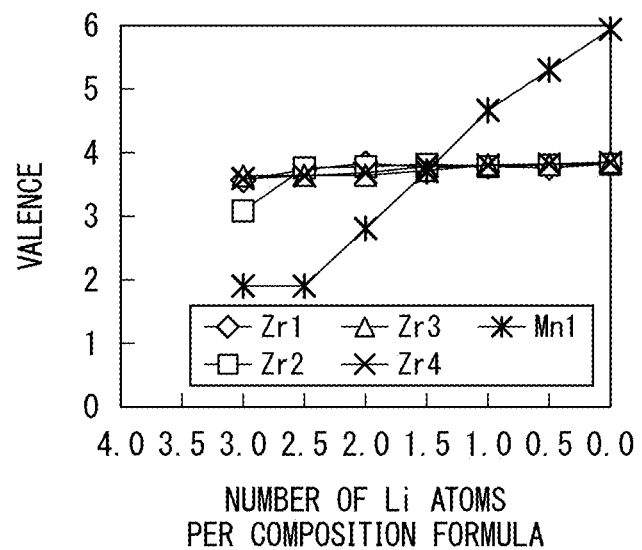
FIG. 10C is a diagram of a measured change in characteristics in $Li_{1+0.5x}Zr_2Mn_{0.5}P_{2.5}O_{12}$ in which a part of phosphorus in $LiZr_2(PO_4)_3$ is substituted with manganese.
Figure 10D:
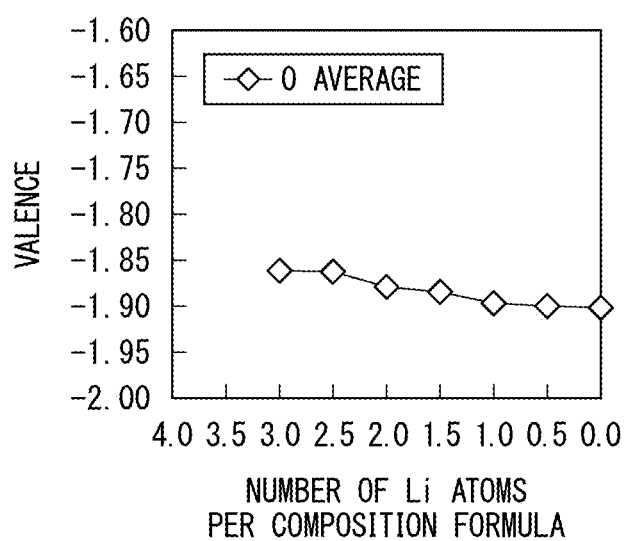
FIG. 10D is a diagram of a measured change in characteristics in $Li_{1+0.5x}Zr_2Mn_{0.5}P_{2.5}O_{12}$ in which a part of phosphorus in $LiZr_2(PO_4)_3$ is substituted with manganese.

In Example 1-5, changes in characteristics of $Li_{1+0.5x}Zr_2Mn_{0.5}P_{2.5}O_{12}$ in which a part of phosphorous of $LiZr_2(PO_4)_3$ was substituted with manganese were measured. The results are shown in FIGS. 10A to 10D. FIG. 10A is a diagram showing a change in potential when the number of Li atoms per composition formula changed, FIG. 10B is a diagram showing the size of a HOMO-LUMO gap of the solid electrolyte with respect to the number of Li atoms per composition formula, FIG. 10C is a diagram showing changes in valences of zirconium and manganese contained in the solid electrolyte when the number of Li atoms per composition formula changed, and FIG. 10D is a diagram showing a change in valence of oxygen contained in the solid electrolyte when the number of Li atoms per composition formula changed.

As shown in FIG. 10B, the solid electrolyte maintained electronic insulation within a range of the number of Li atoms from about 0 to about 2.3 in a case in which a part of phosphorous was substituted with manganese. This was also confirmed from the fact that the valences of zirconium and oxygen shown in FIGS. 10C and 10D did not greatly change with respect to variations in the number of Li atoms. Also, as shown in FIG. 10A, the solid electrolyte in Example 1-5 had a potential window of about 4 V, and the potential window did not significantly become narrow.

When a part of phosphorus or zirconium in $LiZr_2(PO_4)_3$ was substituted with an element with a variable valence as described above, the solid electrolytes were able to maintain electronic insulation within wide ranges regardless of large variations in numbers of Li in any of the cases unlike the cases of the substitution with the elements with invariable valences shown in FIGS. 2A to 2D.

Figure 11A:
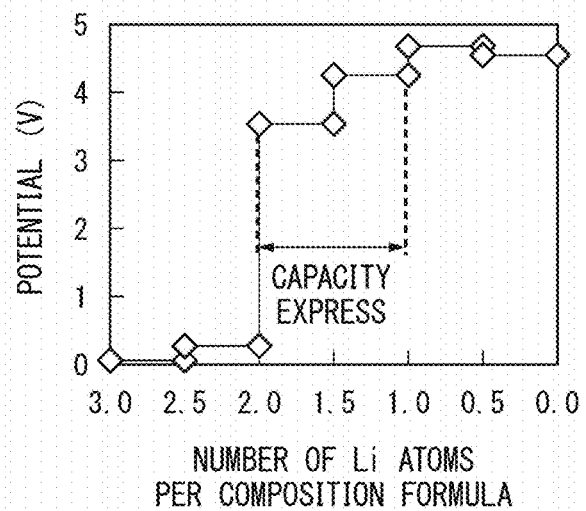
FIG. 11A is a diagram showing distribution of density of states of electrons per a number of Li atoms.
Figure 11B:
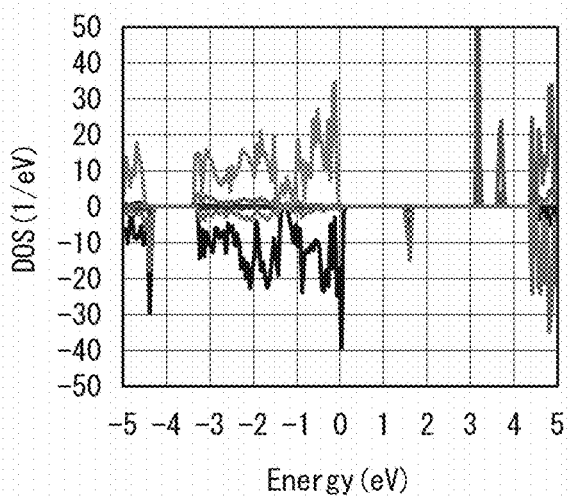
FIG. 11B is a diagram showing distribution of density of states of electrons per a number of Li atoms.
Figure 11C:
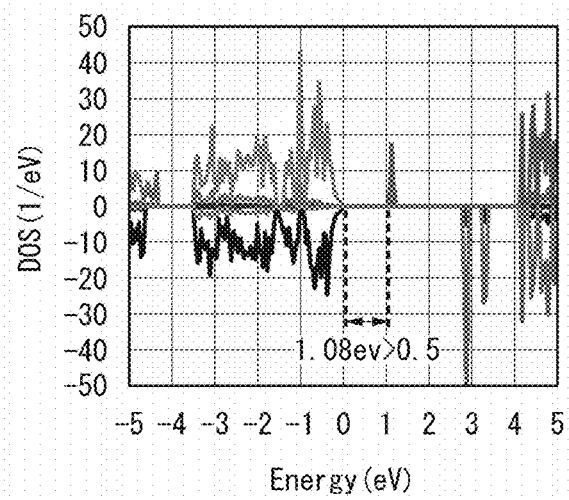
FIG. 11C is a diagram showing distribution of density of states of electrons per a number of Li atoms.
Figure 11D:
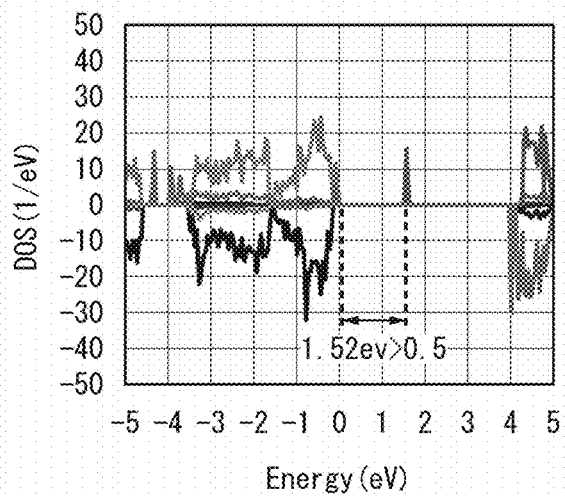
FIG. 11D is a diagram showing distribution of density of states of electrons per a number of Li atoms.
Figure 11E:
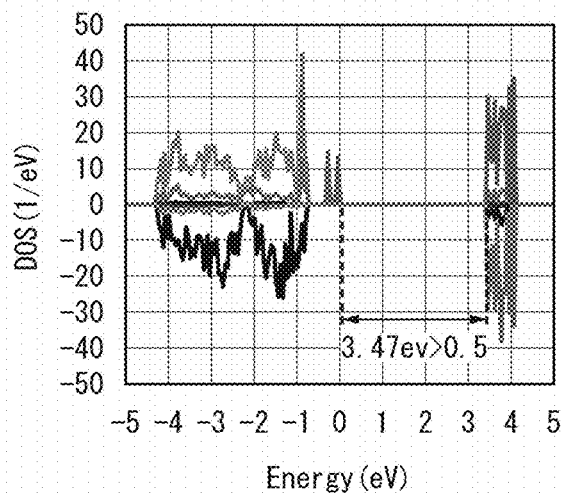
FIG. 11E is a diagram showing distribution of density of states of electrons per a number of Li atoms.
Figure 11F:
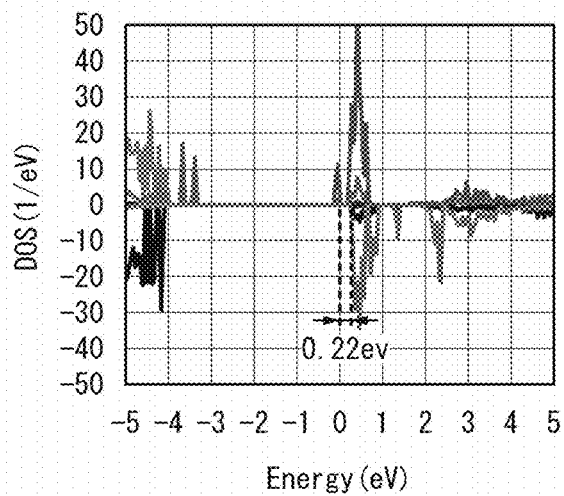
FIG. 11F is a diagram showing distribution of density of states of electrons per a number of Li atoms.

A change in potential when the number of Li atoms per composition formula changed in a case in which a part of zirconium of $LiZr_2(PO_4)_3$ was substituted with Mn to obtain $LiMn_{0.5}Zr_{1.5}(PO_4)_3$ is shown in FIG. 11A. Density of states (DOS) of electrons when the numbers of Li were set to 0.5, 1.0, 1.5, 2.0, and 2.5 is shown in FIGS. 11B to 11F, respectively.

When the number of Li atoms was 0.5 (FIG. 11B), no occupied impurity level was present in the band gap, charge compensation using oxygen occurred, and electronic insulation was thus lost.

When the number of Li atoms was 1.0 (FIG. 11C), an energy difference between the lowest level of energy in the unoccupied impurity levels and the HOMO level was 1.08 eV, which is a sufficient energy difference, and it was thus possible to prevent transition from the HOMO level to the unoccupied impurity level, and as a result, it was possible to maintain an electronic insulated condition in a case in which the number of Li atoms was 1.0.

When the numbers of Li were 1.5 and 2.0 (FIGS. 11D and 11E), the energy differences between the highest levels of energy in the occupied impurity levels and the LUMO levels were 1.52 eV and 3.47 eV, respectively. Since there were sufficient energy differences in both cases, it was possible to prevent transition from the occupied impurity level to the LUMO level. It was possible to recognize that the solid electrolytes had capacities since the numbers of Li were able to vary within a range of 1.0 to 2.0 while electronic insulation was maintained.

When the number of Li atoms was 2.5 e V (FIG. 11F), the unoccupied impurity levels was present in the band gap, but electronic insulation cannot be maintained. This is because the energy difference from the LUMO level is only 0.22 eV, which is too small, and therefore, transition to the LUMO level occurs with some heat energy added.

"Band structure of solid electrolyte"

All the solid electrolyte described in Examples 1-1 to 1-5 were able to maintain electronic insulation within wide ranges regardless of changes in the numbers of Li per composition formula. Meanwhile, ranges of Li in which the solid electrolytes were able to maintain electronic insulation differed depending on each of the substitution elements. In order to find out the reason for the differences, how many times as many unoccupied impurity levels and occupied impurity levels were formed in the band gap as the amount of the substitution element was measured using a Vienna Ab initio Simulation Package (VASP). The results are shown in Table 1.

At the same time, how many times as much as amount of substitution of the substituting element oxidized the level derived from oxygen forming the basic skeleton of the solid electrolyte was measured. If the energy levels derived from oxygen forming the basic skeleton of the solid electrolyte were oxidized, electronic insulation was lost.

TABLE 1

| | Substitution site | Substituting element | Multiple of level formed with respect to amount of substitution with substituting element | | Multiple of levels derived from oxidized with respect to amount of substitution with substituting element |
|---|---|---|---|---|---|
| | | | Occupied impurity level | Non-occupied impurity level | |
| Example 2-1 | Zr | Mn | 0 | 2 | 0 |
| Example 2-2 | Zr | Ni | 0 | 1 | 2 |
| Example 2-3 | Zr | Te | 2 | 2 | 0 |
| Example 2-4 | Zr | W | 2 | 1 | 0 |
| Example 2-5 | P | Cr | 1 | 1 | 0 |
| Example 2-6 | P | Mn | 2 | 3 | 0 |
| Example 2-7 | P | Fe | 2 | 3 | 0 |
| Example 2-8 | P | W | 1 | 5 | 0 |
| Example 2-9 | P | Se | 1 | 2 | 0 |
| Example 2-10 | P | Sn | 0 | 2 | 0 |
| Example 2-11 | P | Te | 1 | 3 | 0 |

In the result in Table 1 shown above, Examples 1-1 corresponded to 2-2, Example 1-4 corresponded to Example 2-8, and Example 1-5 corresponded to Example 2-1.

"Actual Measurement of Solid Electrolyte"

Since the aforementioned results were results of simulation, solid electrolytes were actually produced, and electronic conductivities of the solid electrolytes were actually measured. Also, all-solid secondary batteries were actually produced, and capacities thereof were measured. The results were shown in Table 2.

TABLE 2

| | yMn | yNi | yTe | yW | zCr | zMn | zFe | zW | zSe | zSb | zTe | x | y | z | Smaller one of ΔE1 (*1) and ΔE2 (*2) | Electronic conductivity (S/cm) | Discharge capacity (μAh) |
|---|---|---|---|---|---|---|---|---|---|---|---|---|---|---|---|---|---|
| Example 3-1 | 0.1 | 0 | 0 | 0 | 0 | 0 | 0 | 0 | 0 | 0 | 0 | 1.2 | 0.1 | 0 | 0.87 | 3.8E−11 | 4.19 |
| Comparative Example 3-1 | 0.1 | 0 | 0 | 0 | 0 | 0 | 0 | 0 | 0 | 0 | 0 | 1.3 | 0.1 | 0 | 0.00 | 5.3 E−09 | 3.89 |
| Comparative Example 3-2 | 0 | 0.1 | 0 | 0 | 0 | 0 | 0 | 0 | 0 | 0 | 0 | 1.1 | 0.1 | 0 | 0.00 | 3.0 E−09 | 3.82 |
| Example 3-2 | 0 | 0.1 | 0 | 0 | 0 | 0 | 0 | 0 | 0 | 0 | 0 | 1.2 | 0.1 | 0 | 0.93 | 1.7 E−11 | 4.09 |
| Example 3-3 | 0 | 0 | 0.1 | 0 | 0 | 0 | 0 | 0 | 0 | 0 | 0 | 1.2 | 0.1 | 0 | 0.91 | 1.8 E−11 | 4.31 |
| Comparative Example 3-3 | 0 | 0 | 0.1 | 0 | 0 | 0 | 0 | 0 | 0 | 0 | 0 | 1.3 | 0.1 | 0 | 0.00 | 5.8 E−09 | 3.81 |
| Example 3-4 | 0 | 0 | 0 | 0.1 | 0 | 0 | 0 | 0 | 0 | 0 | 0 | 1.1 | 0.1 | 0 | 0.99 | 3.9 E−11 | 4.22 |
| Comparative Example 3-4 | 0 | 0 | 0 | 0.1 | 0 | 0 | 0 | 0 | 0 | 0 | 0 | 1.2 | 0.1 | 0 | 0.00 | 8.3 E−09 | 3.88 |
| Example 3-5 | 0 | 0 | 0 | 0 | 0.1 | 0 | 0 | 0 | 0 | 0 | 0 | 1.1 | 0 | 0.1 | 0.87 | 4.7E−11 | 4.15 |
| Comparative Example 3-5 | 0 | 0 | 0 | 0 | 0.1 | 0 | 0 | 0 | 0 | 0 | 0 | 1.2 | 0 | 0.1 | 0.01 | 9.5 E−09 | 3.86 |
| Comparative Example 3-6 | 0 | 0 | 0 | 0 | 0 | 0.1 | 0 | 0 | 0 | 0 | 0 | 1.1 | 0 | 0.1 | 0.27 | 3.1 E−09 | 3.88 |
| Example 3-6 | 0 | 0 | 0 | 0 | 0 | 0.1 | 0 | 0 | 0 | 0 | 0 | 1.2 | 0 | 0.1 | 1.20 | 2.1 E−11 | 4.42 |
| Example 3-7 | 0 | 0 | 0 | 0 | 0 | 0 | 0.1 | 0 | 0 | 0 | 0 | 1.3 | 0 | 0.1 | 1.27 | 1.9 E−11 | 4.39 |
| Comparative Example 3-7 | 0 | 0 | 0 | 0 | 0 | 0 | 0.1 | 0 | 0 | 0 | 0 | 1.4 | 0 | 0.1 | 0.11 | 6.4 E−09 | 3.89 |
| Example 3-8 | 0 | 0 | 0 | 0 | 0 | 0 | 0 | 0.1 | 0 | 0 | 0 | 1.5 | 00 | 0.1 | 1.33 | 3.6E−11 | 4.47 |
| Comparative Example 3-8 | 0 | 0 | 0 | 0 | 0 | 0 | 0 | 0.1 | 0 | 0 | 0 | 1.6 | 0 | 0.1 | 0.00 | 7.2 E−09 | 3.85 |
| Example 3-9 | 0 | 0 | 0 | 0 | 0 | 0 | 0 | 0 | 0.1 | 0 | 0 | 1.2 | 0 | 0.1 | 1.66 | 5.5 E−11 | 4.26 |
| Comparative Example 3-9 | 0 | 0 | 0 | 0 | 0 | 0 | 0 | 0 | 0.1 | 0 | 0 | 1.3 | 0 | 0.1 | 0.13 | 5.0 E−09 | 3.80 |
| Example 3-10 | 0 | 0 | 0 | 0 | 0 | 0 | 0 | 0 | 0 | 0.1 | 0 | 1.1 | 0 | 0.1 | 1.94 | 5.1 E−11 | 4.14 |
| Comparative Example 3-10 | 0 | 0 | 0 | 0 | 0 | 0 | 0 | 0 | 0 | 0.1 | 0 | 1.2 | 0 | 0.1 | 0.00 | 7.3 E−09 | 3.73 |
| Example 3-11 | 0 | 0 | 0 | 0 | 0 | 0 | 0 | 0 | 0 | 0 | 0.1 | 1.1 | 0 | 0.1 | 1.27 | 9.4E−11 | 4.36 |
| Comparative Example 3-11 | 0 | 0 | 0 | 0 | 0 | 0 | 0 | 0 | 0 | 0 | 0.1 | 1.2 | 0 | 0.1 | 0.22 | 5.5 E−09 | 3.89 |
| Example 3-12 | 0.1 | 0.1 | 0 | 0 | 0 | 0 | 0 | 0 | 0 | 0 | 0 | 1.3 | 0.2 | 0 | 0.90 | 9.0 E−11 | 4.29 |
| Example 3-13 | 0 | 0 | 0 | 0 | 0 | 0.1 | 0.1 | 0 | 0 | 0 | 0 | 1.0 | 0 | 0.2 | 1.07 | 4.8 E−11 | 5.00 |

*1 : ΔE1: an energy difference between he highest level of energy in the occupied in purity levels and a LUMO level
*2 : ΔE2: an energy difference between the lowest level of energy in the unoccupied impurity levels and a HOMO level The solid electrolytes in Examples 3-1 to 3-13 and Comparative Examples 3-1 to 3-11 were represented as $Li_xM1_yZr_{2-y}M2_zP_{3-z}O_{12}$. M1 was at least one selected from the group consisting of Mn, Ni, Te, and W. M2 was at least one selected from the group consisting of Cr, Mn, Fe, W, Se, Sb, and Te. In Table 2, $y_{Mn}$, $y_{Ni}$, $y_{Te}$, $y_W$, $z_{Cr}$, $z_{Mn}$, $z_{Fe}$, $z_W$, $z_{Se}$, $z_{Sb}$, and $z_{Te}$ represent amounts of Mn, Ni, Te, W, Cr, Mn, Fe, W, Se, Sb, and Te, respectively.

The electronic conductivity was measured for produced sintered bodies of the solid electrolytes. The electronic conductivity was calculated using the results of measurements of currents flowing when a voltage of 1 V was applied to the sintered bodies.

All-solid secondary batteries were actually produced, and a charging and discharging test was conducted. As measurement conditions, both currents at the time of charging and discharging were set to 2.0 μA, cut-off voltages at the time of charging and discharging were set to 4.0 V and 0 V, respectively, and discharge capacities were recorded. Each all-solid secondary battery was produced through a simultaneous sintering method by laminating the solid electrolyte 3, the positive electrode active material layer 1B, the positive electrode current collector layer 1A, the positive electrode active material layer 1B, the solid electrolyte 3, the negative electrode active material layer 2B, the negative electrode current collector layer 2A, the negative electrode active material layer 2B, and the solid electrolyte 3 in this order. Cu was used for the positive electrode current collector layer and the negative electrode current collector layer, and $Li_3V_2(PO_4)_3$ was employed for both the positive electrode active material layer and the negative electrode active material layer.

It was possible to recognize that regardless of the elements with which substitution was performed, electronic conductivity was reduced to be sufficiently low, and large capacities were obtained as long as the smaller one of the energy difference $\Delta E_1$ between the highest level of energy in the occupied impurity levels and the LUMO level and the energy difference $\Delta E_2$ between the highest level of energy in the unoccupied impurity levels and the HOMO level is equal to or greater than 0.3 eV.

It was conceivable from the aforementioned results that since the solid electrolytes contained in the all-solid secondary batteries were able to maintain electronic insulation, the discharge capacities were enhanced as a result of self-discharge of the all-solid secondary batteries being prevented. The results satisfactorily corresponded to the results of the simulation.

In order to confirm that the effects of the invention were achieved using substances other than the zirconium phosphate-based and lithium-containing oxide, $Li_{0.35}La_{0.55}TiO_3$, $NaZr_2P_3O_{12}$, $Mg_{0.5}Zr_2P_3O_{12}$, $Li_7La_3Zr_2O_{12}$, $Li_{10}GeP_2S_{12}$ and solid electrolytes thereof obtained through substitution with elements were produced, and electronic conductivity of the solid electrolytes was measured. Also, these solid electrolytes were used to produce all-solid secondary batteries, and capacities thereof were measured. The results are shown in Table 3. NaV$_2$(PO$_4$)$_3$ was used as an active material in a case in which NaZr$_2$P$_3$O$_{12}$ was used as the solid electrolyte, and Mg$_{1.5}$V$_2$(PO$_4$)$_3$ was used as an active material in a case in which Mg$_{0.5}$Zr$_2$P$_3$O$_{12}$ was used as the solid electrolyte. For the solid electrolyte Li$_{10}$GeP$_2$S$_{12}$, raw material powder of Li$_{10}$GeP$_2$S$_{12}$ and raw material powder containing substituting elements were synthesized by a mechanical milling method using a planet-type ball mill and were then annealed in an inert atmosphere. In a case in which Li$_{10}$GeP$_2$S$_{12}$ was used as the solid electrolyte, positive electrode powder, solid electrolyte powder, and negative electrode powder were pressure-molded in order, thereby producing the all-solid secondary battery.

TABLE 3

| | | Smaller one of ΔE1 and ΔE2 | Electronic conductivity (S/cm) | Discharge capacity (μAh) |
|---|---|---|---|---|
| Comparative Example 4-1 | Li$_{0.35}$La$_{0.55}$TiO$_3$ | 0 | 4.71E−11 | 3.87 |
| Example 4-1 | Li$_{0.35}$La$_{0.55}$Mn$_{0.1}$Ti$_{0.9}$O$_3$ | 0.83 | 5.49E−11 | 4.24 |
| Comparative Example 4-2 | NaZr$_2$P$_3$O$_{12}$ | 0 | 7.74E−11 | 3.91 |
| Example 4-2 | NaZr$_2$Mn$_{0.1}$P$_{2.9}$O$_{12}$ | 0.78 | 3.17E−11 | 4.51 |
| Comparative Example 4-3 | Mg$_{0.5}$Zr$_2$P$_3$O$_{12}$ | 0 | 1.06E−11 | 3.79 |
| Example 4-3 | Mg$_{0.5}$Zr$_2$P$_3$O$_{12}$ | 0.96 | 8.63E−11 | 4.49 |
| Comparative Example 4-4 | Li$_7$La$_3$Zr$_2$O$_{12}$ | 0 | 1.40E−11 | 3.82 |
| Example 4-4 | Li$_7$La$_3$Mn$_{0.1}$Zr$_{1.9}$O$_{12}$ | 0.83 | 2.00E−11 | 4.27 |
| Comparative Example 4-5 | Li$_{10}$GeP$_2$S$_{12}$ | 0 | 2.00E−11 | 3.83 |
| Example 4-5 | Li$_{10}$GeMn$_{0.1}$P$_{1.9}$S$_{12}$ | 0.77 | 1.60E−11 | 4.56 |

It was possible to recognize that electronic conductivity was reduced to be sufficiently low and large capacities were obtained as long as the smaller one of the energy difference ΔE$_1$ between the highest level of energy in the occupied impurity levels and the LUMO level and an energy difference ΔE$_2$ between the lowest level of energy in the unoccupied impurity levels and the HOMO level is equal to or greater than 0.3 eV regardless of types of the material systems and mobile ions of the solid electrolytes.

It was conceivable from the aforementioned results that discharge capacities were enhanced as a result of self-discharge of the all-solid secondary batteries being prevented since the solid electrolytes contained in the all-solid secondary batteries were able to maintain electronic insulation.

INDUSTRIAL APPLICABILITY

According to the invention, it is possible to provide a solid electrolyte capable of maintaining electronic insulation.

REFERENCE SIGNS LIST

1 Positive electrode layer
1A Positive electrode current collector layer
1B Positive electrode active material layer
2 Negative electrode layer
2A Negative electrode current collector layer
2B Negative electrode active material layer
3 Solid electrolyte
3a Unoccupied impurity level
3b Occupied impurity level
4 Layered body
5, 6 Terminal electrode
10 All-solid secondary battery

What is claimed is:

1. A solid electrolyte,
   wherein a part of an element contained in a mobile ion-containing material is substituted, and an occupied impurity level that is occupied by electrons or an unoccupied impurity level that is not occupied by electrons is provided between a valence band and a conduction band of the mobile ion-containing material, and
   a smaller energy difference out of an energy difference between a highest level of energy in the occupied impurity level and a LUMO level and an energy difference between a lowest level of energy in the unoccupied impurity level and a HOMO level is greater than 0.3 eV,
   wherein the mobile ion-containing material is a zirconium phosphate-based solid electrolyte, and
   a part of zirconium in the solid electrolyte is substituted with at least one selected from the group consisting of Mn, Te, and W, or a part of a phosphorous in the solid electrolyte is substituted with at least one selected from the group consisting of Cr, Mn, Fe, W, Se, Sb, and Te,
   wherein the solid electrolyte does not contain Ti.

2. The solid electrolyte according to claim 1, wherein the smaller energy difference out of the energy difference between the highest level of energy in the occupied impurity level and the LUMO level and the energy difference between the lowest level of energy in the unoccupied impurity level and the HOMO level is equal to or greater than 0.7 eV.

3. The solid electrolyte according to claim 1,
   wherein the solid electrolyte is represented as a formula Li$_x$M1$_y$Zr$_{2-y}$M2$_z$P$_{3-z}$O$_{12}$,
   M1 is at least one selected from the group consisting of Mn, Te, and W,
   M2 is at least one selected from the group consisting of Cr, Mn, Fe, W, Se, Sb, and Te, and
   when it is assumed that amounts of Mn, Te, and W in M1 are y$_{Mn}$, y$_{Te}$, and y$_W$, respectively, in this order and that amounts of Cr, Mn, Fe, W, Se, Sb, and Te in M2 are z$_{Cr}$, z$_{Mn}$, z$_{Fe}$, z$_W$, z$_{Se}$, z$_{Sb}$, and z$_{Te}$, respectively in this order,
   1−2y$_W$−2y$_{Te}$−z$_{Cr}$+2z$_{Mn}$−2z$_{Fe}$−z$_W$−z$_{se}$−z$_{Te}$≤x≤1+2y$_{Mn}$+y$_W$+2y$_{Te}$+z$_{Cr}$+3z$_{Mn}$+3z$_{Fe}$+5z$_W$+2z$_{Se}$+z$_{Sb}$+z$_{Te}$, and 0≤y<1, and 0≤z<1.5 may be satisfied (except for y=z=0).

4. An all-solid secondary battery comprising:
   the solid electrolyte according to claim 1.

5. The all-solid secondary battery according to claim 4, wherein a relative density of a pair of electrode layers and a solid electrolyte layer that has the solid electrolyte provided between the pair of electrode layers is equal to or greater than 80%.

6. The solid electrolyte according to claim 1, wherein a part of a phosphorous in the solid electrolyte is substituted with at least one selected from the group consisting of Cr, Mn, Fe, W, Se, Sb, and Te.

* * * * *